United States Patent
von Rosen et al.

(10) Patent No.: US 6,845,365 B2
(45) Date of Patent: Jan. 18, 2005

(54) METHOD AND APPARATUS FOR CREATING AND ORDERING CUSTOMIZED BRANDED MERCHANDISE OVER A COMPUTER NETWORK

(75) Inventors: Ernest J. A. von Rosen, Vancouver (CA); Vaclav Vincalek, Burnaby (CA)

(73) Assignee: Jones Soda Co., Seattle, WA (US)

( * ) Notice: Subject to any disclaimer, the term of this patent is extended or adjusted under 35 U.S.C. 154(b) by 0 days.

(21) Appl. No.: 10/314,028

(22) Filed: Dec. 6, 2002

(65) Prior Publication Data

US 2003/0069809 A1 Apr. 10, 2003

Related U.S. Application Data

(63) Continuation of application No. 09/487,509, filed on Jan. 19, 2000, now Pat. No. 6,493,677.

(51) Int. Cl.[7] ............................................... G06F 17/60
(52) U.S. Cl. ......................................................... 705/27
(58) Field of Search ..................................... 705/26, 27

(56) References Cited

U.S. PATENT DOCUMENTS

| | | | | |
|---|---|---|---|---|
| 5,930,768 A | * | 7/1999 | Hooban ........................ | 705/27 |
| 5,970,471 A | * | 10/1999 | Hill .............................. | 705/26 |
| 6,052,669 A | * | 4/2000 | Smith et al. ................... | 705/26 |
| 6,353,770 B1 | * | 3/2002 | Ramsey et al. .............. | 700/131 |
| 6,493,677 B1 | * | 12/2002 | von Rosen et al. ............ | 705/27 |
| 6,535,294 B1 | * | 3/2003 | Arledge, Jr. et al. .......... | 705/26 |

FOREIGN PATENT DOCUMENTS

| | | | | |
|---|---|---|---|---|
| KR | 2001104504 A | | 11/2001 | |
| KR | 2001-104504 A | * | 11/2001 | ........... G06F/17/60 |
| WO | WO 01/26006 A2 | | 4/2001 | |

OTHER PUBLICATIONS

"Labatt's Customized Photo–Label Beer Pulls in Sales", Mar. 21, 2002, Daily World Wire.*
"Starbelly.com", Mar. 1, 2000, Direct, p. 2.*

(List continued on next page.)

*Primary Examiner*—Bryan Jaketic
(74) *Attorney, Agent, or Firm*—Christensen O'Connor Johnson Kindness PLLC

(57) ABSTRACT

The present invention provides a method and apparatus for creating and ordering customized branded merchandise over a computer network. A Internet site is provided that allows a consumer to create and order customized branded merchandise, such as bottles of soda. A customer may visit the WWW site utilizing a standard WWW browser executing on a computer. Once the customer has registered with the WWW site, the customer may place an order for an item of customized branded merchandise. The customer may also be asked to identify a graphic image for customizing the requested merchandise. The graphic image may be a digital photograph taken by the customer or other type of graphic image. Once the customer has identified a graphic image, the graphic image may be displayed for editing. The customer may be permitted to crop the graphic image or perform other types of image manipulations. A preview of the cropped or manipulated image may also be provided for the customer. Once the customer is satisfied with the graphic image, the graphic image may be transmitted to the WWW server. Once the customer has specified order details, the customer may be asked to provide a billing and shipping address. The customer may then be asked to identify a payment method, and provide a credit card or other billing number. The customer may then be provided with a summary of the order details and asked to verify that all of the information is correct. If the information is correct, the customized branded merchandise item ordered by the customer will be created and shipped to the customer at address they provided.

12 Claims, 20 Drawing Sheets

OTHER PUBLICATIONS iPrint.com Web Site, 1 page, Copyright © 1996–1999.

Nichols, P., "Report: Repeat Customers Provide 53% of E-Commerce Revenue," *E-Commerce News Archives*, on Internet News.com Web Site, 3 pages, Sep. 4, 1998.

"Photoloft.com and The Park Announce Agreement for Digital Imaging in The Park's New Virtual Gift Shop," Company Press Release on *Business Wire* Web Site, 3 pages, Oct. 27, 1999.

"Photoloft.com To Add Photo-Personalized Greeting Cards to Xoom.com Greeting Card Service," Company Press Release on PhotoLoft.com Web Site, 2 pages, Oct. 18, 1999.

*Pop The Soda Shop* Web Site at http://mysodas.com (3 pages); http://mysodas.com/samples.html (2 pages); http://mysodas.com/catalogs/index.html (2 pages), Nov. 29, 1999.

"Starbelly.com," *Direct*, p. Sec. 2, Mar. 1, 2000.

* cited by examiner

METHOD AND APPARATUS FOR CREATING AND ORDERING CUSTOMIZED BRANDED MERCHANDISE OVER A COMPUTER NETWORK

CROSS-REFERENCE TO RELATED APPLICATION(s)

This application is a continuation of U.S. patent application No. 09/487,509, filed Jan. 19, 2000, now U.S. Pat. No. 6,493,677 the benefit of the priority of the filing date is hereby claimed under 35 U.S.C. §120. The above-identified application is incorporated herein by reference in its entirety.

FIELD OF THE INVENTION

This invention generally relates to electronic commerce and, more specifically, to a method and apparatus for creating and ordering personalized branded merchandise over a computer network.

BACKGROUND OF THE INVENTION

For some time, consumers have been able to purchase merchandise personalized to their own specific tastes. For instance, consumers of all ages have long enjoyed wearing T-shirts with their own personalized message printed on the front or back. However, buying customized goods like T-shirts has never been easy. Typically, a consumer wanting to purchase personalized merchandise would have to make a trip to the mall or store where such merchandise is sold. Once at the store, the consumer would have to wait in line for assistance, and then wait again while the merchandise was being created. Moreover, the consumer would only be able to view the final product after it had already been created. If the product did not look exactly the way the consumer wanted, many times the consumer would be forced to purchase the product anyway. For these reasons, purchasing customized products has not been a pleasant experience for consumers.

Another drawback for consumers wishing to purchase customized merchandise is that the types of goods that may be personalized have traditionally been very limited. For instance, consumers have long been able to purchase personalized T-shirts, but have been unable to purchase customized soda bottles, or other types of goods. Furthermore, consumers have never been able to purchase personalized goods that are branded with a manufacturers' trademark. For instance, consumers have never been able to purchase a soda bottle exactly the way it would appear on a retailer's shelf, and have it personalized to their specifications. Because of the brand awareness and goodwill that comes with many types of trade dress and trademarks, consumers are likely be interested in purchasing trademarked goods that can be customized to their specifications. However, there has never been a system available to consumers for purchasing such goods.

Therefore, in light of these problems, there is a need for a method and system for creating and ordering customized branded merchandise that allows a consumer to easily and conveniently purchase merchandise personalized to their own tastes. There is a further need for a method and system for creating and ordering customized merchandise that will allow a consumer to personalize a product with a graphic image and text supplied by the consumer, and to view a preview of the merchandise before it is manufactured. There is an additional need for a method and system for creating and ordering customized merchandise that allows the consumer to purchase merchandise branded with a manufacturer's trademark, and also personalized with a graphic image and text provided by the consumer.

SUMMARY OF THE INVENTION

The present invention solves the above described problems by providing a method and apparatus for creating and ordering customized branded merchandise over a computer network. According to one actual embodiment of the invention, a World Wide Web ("WWW") site is provided that allows a consumer to create and order customized branded merchandise, such as bottles of soda. Advantageously, the WWW site may allow the consumer to upload pictures, text, or other information for inclusion on the requested merchandise. Moreover, once the consumer has specified how the customized merchandise should appear, the WWW site can automate the production of the merchandise and the shipping of the merchandise to the customer.

Generally described, the present invention provides a WWW site for creating and ordering customized branded merchandise. According to an aspect of the invention, a customer may visit the WWW site utilizing a standard WWW browser executing on a computer. Once at the WWW site, the customer may register with the WWW site by providing their name, address, phone number, e-mail address, and other identifying information. A new account may then be created for the customer that the customer may access later by using an assigned password.

Once the customer has registered with the WWW site, the customer may place an order for an item of customized branded merchandise. The customer may be asked to provide a short description of the order for later identification. The customer may also be asked to identify a graphic image for customizing the requested merchandise. The graphic image may be a digital photograph provided by the customer or other type of graphic image. Once the customer has identified a graphic image, the graphic image may be displayed for editing. The customer may be permitted to crop the graphic image or perform other types of image manipulations. A preview of the cropped or manipulated image may also be provided for the customer. Once the customer is satisfied with the graphic image, the graphic image, or information describing any changes made to the image made by the user, may be transmitted to the WWW server.

The customer may also be asked to provide a photo credit for the graphic image. Additionally, the customer may also be asked to provide a text message to be included on the personalized merchandise item. Once this information has been received from the customer, a visual preview of the customized branded merchandise item requested by the customer may be provided. If the customer approves the item, the customer may be asked to provide additional order details, such as quantity, color, and the like.

Once the customer has specified the order details, the customer may be asked to provide a billing and shipping address. The customer may then be asked to identify a payment method, and provide a credit card or other billing number. The customer may then be provided with a summary of the order details and asked to verify that all of the information is correct. If the information is correct, the customized branded merchandise item ordered by the customer will be created and shipped to the customer at the provided address.

According to an actual embodiment of the invention, the customer may request to purchase customized bottles of soda branded with a manufacturer's trademark from the WWW site. The bottle labels may be customized with the graphic image, text message, and photo credit provided by the customer. Other information provided by the customer may also be included on the bottle labels. Moreover, a trademark, like "JONES SODA CO.", may also be included on the bottle labels. The customer may be able to specify the quantity, flavor, and other product information prior to ordering at the WWW site. Once the labels have been created, the bottles are labeled with the customized branded labels, the customer's credit card is charged, and the product is shipped to the customer.

In accordance with yet other aspects of the invention, a system, a computer-controlled apparatus, and a computer-readable medium containing instructions are also provided for creating and ordering customized branded merchandise over a computer network.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
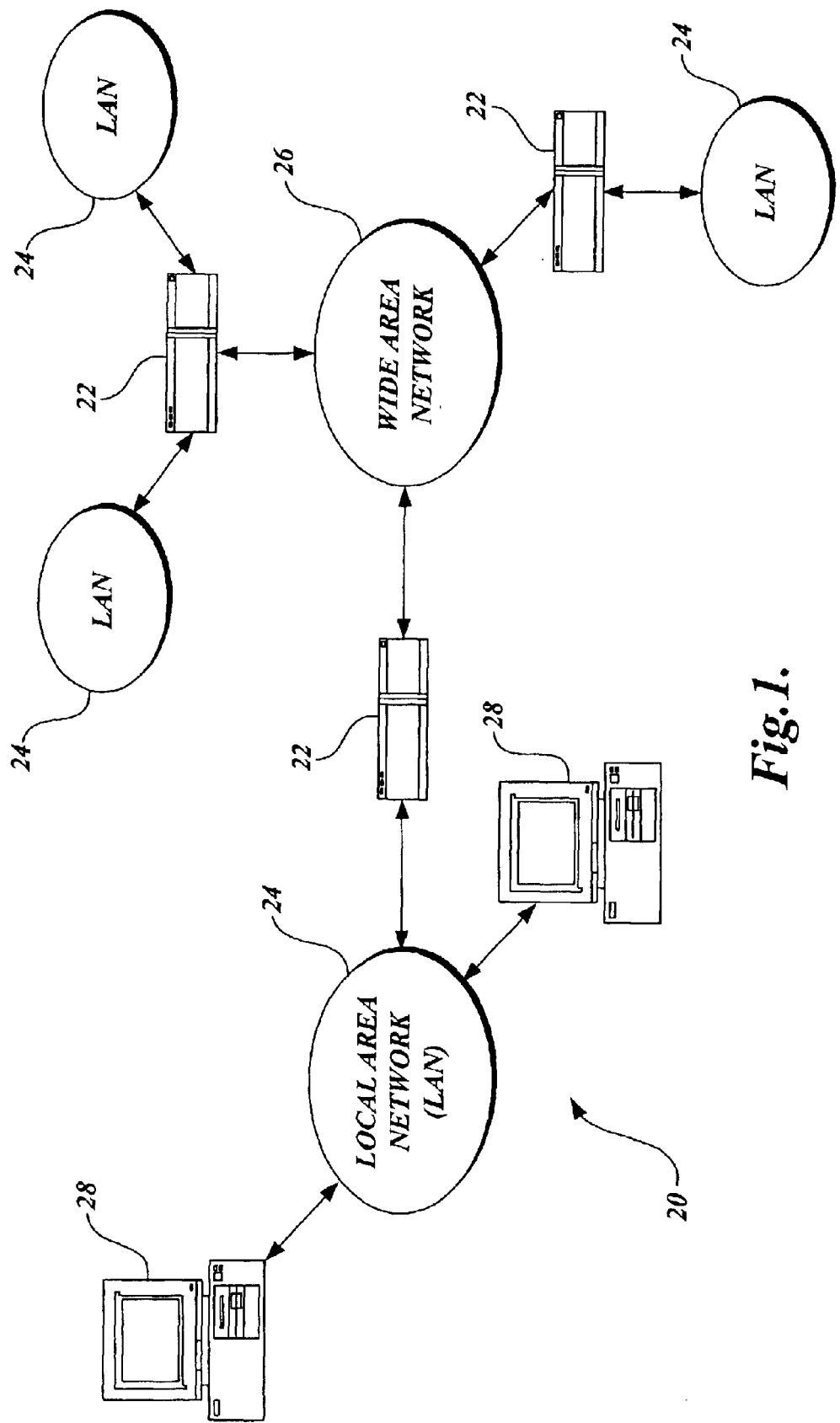
FIG. 1 is a block diagram of a representative portion of the Internet.

As described above, aspects of the present invention are embodied in a WWW site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, in which a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as remote computer 28, and other related electronic devices can be remotely connected to either the LANs 24 or the WAN 26 via a modem and temporary telephone link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" throughout the Internet. A WWW site is a server computer connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote user may retrieve hypertext documents from the WWW via a WWW browser application program. A WWW browser, such as Netscape's NAVIGATOR® or Microsoft's INTERNET EXPLORER®, is a software application program for providing a graphical user interface to the WWW. Upon request from the consumer via the WWW browser, the WWW browser accesses and retrieves the desired hypertext document from the appropriate WWW server using the URL for the document and a protocol known as HyperText Transfer Protocol ("HTTP"). HTTP is a higher-level protocol then TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer.

Figure 2:
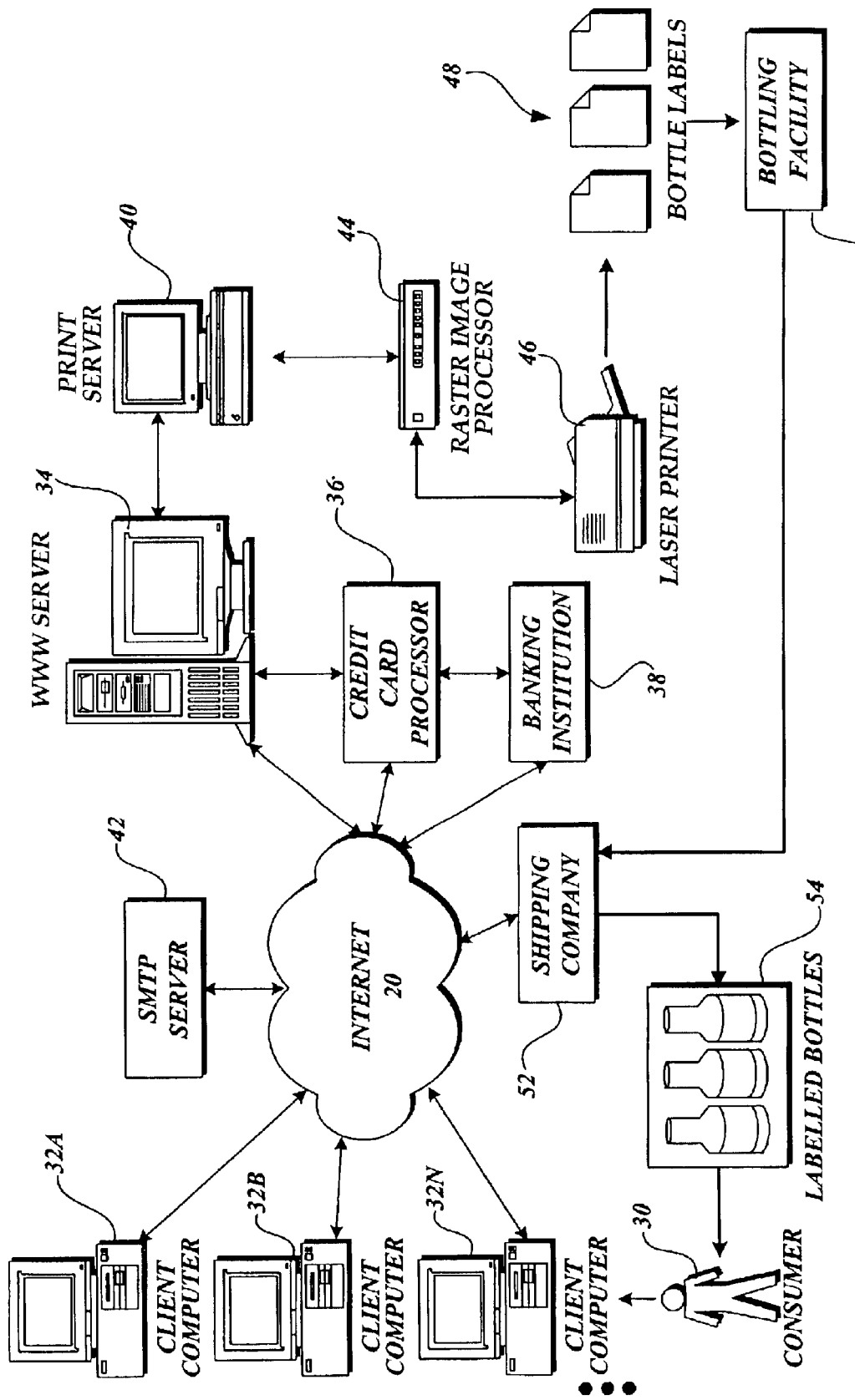
FIG. 2 is a block diagram illustrating an actual- embodiment of the present invention.

Referring now to FIG. 2, an actual embodiment of the present invention will be described. A consumer 30 may utilize client computer 32 to connect to the Internet 20 through a modem or other type of connection. Once connected to the Internet 20, client computer 32 may utilize a WWW browser application program to view and interact with WWW sites such as a WWW site provided by WWW server 34. As is known to those skilled in the art, client computer 32 may comprise a general purpose personal computer capable of executing a WWW browser application program. Client computer 32 may also comprise another type of computing device such as a palm-top computer, a cell phone, personal digital assistant, or the like. Client computer 32 is described in more detail below with reference to FIG. 4.

According to an actual embodiment of the present invention, WWW server 34 is operative to provide a WWW site for creating and ordering customized branded merchandise. Accordingly, WWW server 34 transmits WWW pages to the WWW browser application program executing on client computer 32 to carry out this process. For instance, WWW server 34 may transmit pages and forms for receiving information about consumer 30, such as their address, telephone number, billing information, credit card number, etc. Moreover, WWW server 34 may transmit WWW pages to client computer 32 that allow consumer 30 to identify the merchandise they wish to order, to customize the merchandise by providing a graphic image and a text message, and to specify the quantity of the merchandise they wish to order. Once WWW server 34 has received this information, WWW server is operative to transmit the credit card information of consumer 30 to credit card processor 36 to pay for the merchandise. In turn, credit card processor 36 may transmit the information to banking institution 38 to debit funds from an account associated with consumer 30 and to transfer the funds into an account associated with the merchant operating WWW server 34. These transactions may take place over the Internet 20 or some other communications network known to those skilled in the art. Operation of WWW server 34 is described in further detail below with respect to FIGS. 3 and 6–13B.

Once WWW server 34 has received all of the necessary information to create the requested customized branded merchandise, portions of the information may be sent to print server 40. In an actual embodiment of the present invention, the customized branded merchandise available from WWW server 34 comprises bottles having labels customized with a graphic image and a text message provided by consumer 30. Also, the labels contain a trademark, such as "JONES SODA CO." According to this embodiment of the present invention, graphic images of the labels are transmitted by WWW server 34 to print server 40. Print server 40 transmits the bottle labels to laser printer 46 via raster image processor 44. Those skilled in art should the appreciate that although laser printer 46 comprises a color laser printer in the illustrative embodiment, other types of printers may be used. For instance, special purpose printers may be used to create customized products such as t-shirts, cups, billboards, etc. The operation of print server 40 is described in more detail below with reference to FIG. 5.

Once bottle labels 48 have been printed by laser printer 46, they are utilized at a bottling facility 50 to label the bottles. The labeled bottles 54 are then packed for shipping. The labeled bottles 54 may then be picked up by shipping company 52 for delivery to consumer 30. An e-mail notification may be sent to consumer 30 through Simple Mail Transfer Protocol ("SMTP") server 42, informing the consumer 30 that their order has been shipped and that their credit card has been charged.

Figure 3:
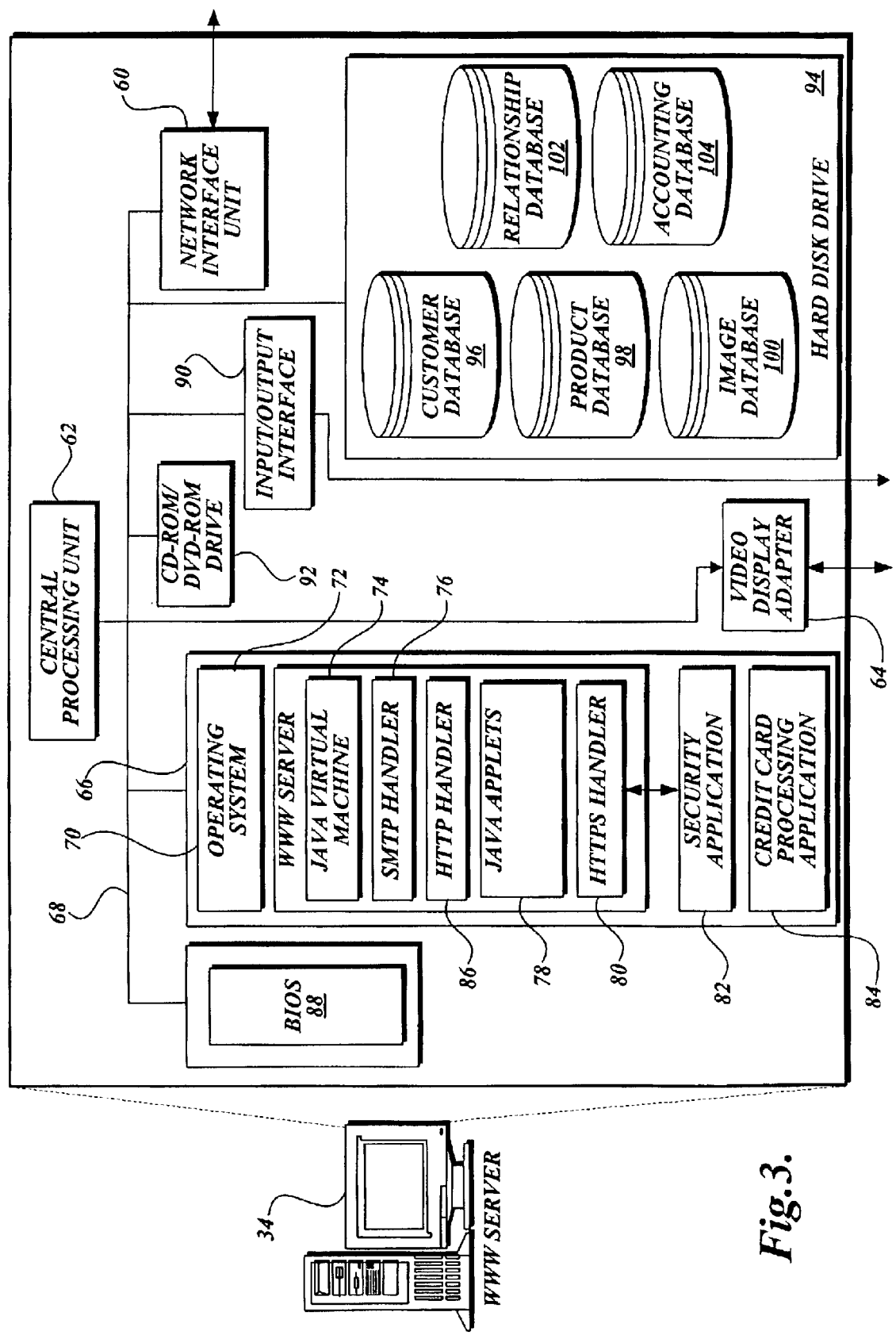
FIG. 3 is a block diagram depicting an illustrative architecture for an actual WWW server computer embodying aspects of the present invention.

FIG. 3 depicts several of the key components of the WWW server 34. Those of ordinary skill in the art will appreciate that the WWW server 34 includes many more components then those shown in FIG. 3. However, it is not necessary that all of these generally conventional components be shown in order to disclose an illustrative embodiment for practicing the present invention. As shown in FIG. 3, the WWW server 34 is connected to the Internet 20, or other communications network, via a network interface unit 60. Those of ordinary skill in the art will appreciate that the network interface unit 60 includes the necessary circuitry for connecting the WWW server 34 to the Internet 20, and is constructed for use with the TCP/IP protocol.

The WWW server 34 also includes a processing unit 62, a video display adapter 64, and a mass memory 66, all connected via bus 68. The mass memory 66 generally comprises a RAM, ROM, and a permanent mass storage device, such as a hard disk drive, tape drive, optical drive, floppy disk drive, or combination thereof. The mass memory 66 stores an operating system 70 for controlling the operation of the WWW server 34. It will be appreciated that this component may comprise a general purpose server operating system as is known to those of ordinary skill in the art, such as UNIX, LINUX™, or Microsoft WINDOWS NT®. A binary input/output system ("BIOS") 88 is also provided for controlling the low-level operation of WWW server 34.

The mass memory 66 also stores the program code and data for providing a WWW site for creating and ordering customized branded merchandise. More specifically, the mass memory 66 stores a WWW server application program 72 as known to those skilled in the art. The WWW server application program 72 comprises computer executable instructions which, when executed by the WWW server computer 34, generate the WWW browser displays shown in FIGS. 6–11B, including performing the logic described below with respect to FIGS. 12–13B. The WWW server 72 may include a JAVA virtual machine 74, a SMTP handler application 76 for transmitting and receiving e-mail, a HTTP handler application 86 for receiving and handing HTTP requests, JAVA applets 78 for transmission to a WWW browser executing on a client computer, and an HTTPS handler application 80 for handling secure connections. The HTTPS handler application 80 may initiate communication with an external security application 82, or a credit card processing application 84 for communicating with remote financial institutions in a secure fashion.

WWW server 34 also comprises an input/output interface 90 for communicating with external devices, such as a mouse, keyboard, scanner, or other input devices not shown in FIG. 3. Likewise, WWW server 34 may further comprise additional mass storage facilities such as CD-ROM/DVD-ROM drive 92 and hard disk drive 94. According to an embodiment of the present invention, hard disk drive 94 is utilized by WWW server application program 72 to store several databases. In particular, the following databases may be stored and utilized by WWW server application program 72: customer database 96, product database 98, image database 100, relationship database 102, and accounting database 104. Customer database 96 may be utilized to store customer data, including account information such as customer name, address, user identification number, password, order history, credit card information, etc. Product database 98 may be utilized to store information regarding the available products, inventory levels, etc. Image database 100 may be utilized to store graphic images transmitted to WWW server 34 by customers. Relationship database 102 may be utilized to store information regarding relationships with other retailers and/or partners. Accounting database 104 may be utilized to store information regarding the number of units sold, accounts receivable and payable, and other accounting information. The operation and implementation of these databases is well known to those skilled in the art.

Figure 4:
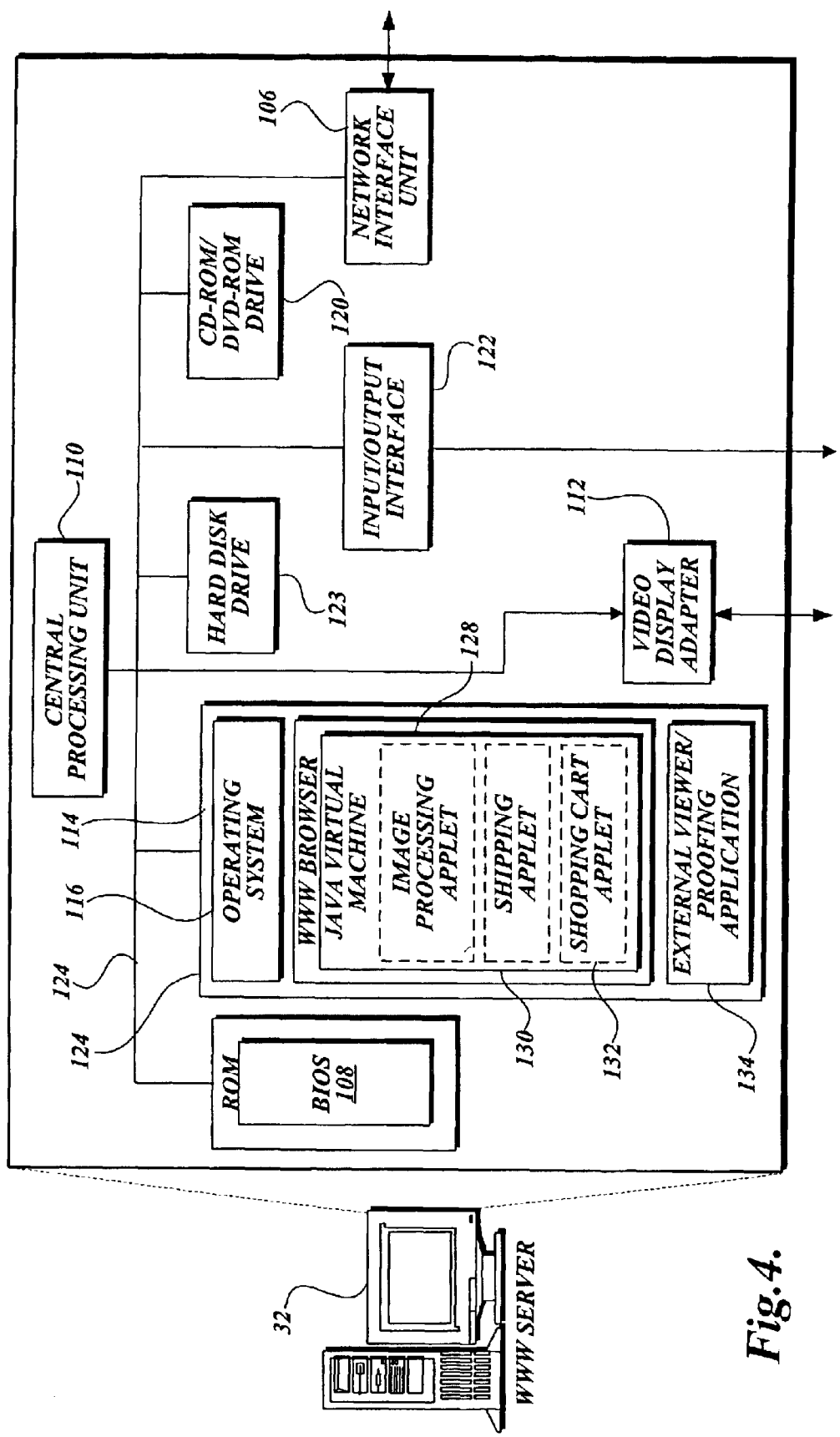
FIG. 4 is a block diagram depicting an illustrative architecture for a client computer used to browse a WWW site embodying aspects of the present invention.

FIG. 4 depicts several of the key components of the client computer 32. Those of ordinary skill in the art will appreciate that the client computer 32 includes many more components then those shown in FIG. 4. However, it is not necessary that all of these generally conventional components be shown in order to disclose an illustrative embodiment for practicing the present invention. As shown in FIG. 4, the client computer 32 includes a network interface unit 106 for connecting to a LAN or WAN, or for connecting remotely to a LAN or WAN. Those of ordinary skill in the art will appreciate that the network interface unit 106 includes the necessary circuitry for such a connection, and is also constructed for use with the TCP/IP protocol, the particular network configuration of the LAN or WAN it is connecting to, and a particular type of coupling medium. The client computer 32 may also be equipped with a network interface unit 106 capable of connecting to the Internet through a point to point protocol ("PPP") connection or a SLIP connection as known to those skilled in the art.

The client computer 32 also includes a ROM BIOS 108, central processing unit 110, a video display adapter 112, and a memory 114. The memory 114 generally comprises a random access memory ("RAM"), a read-only memory ("ROM") and a permanent mass storage device, such as a disk drive. The memory 114 stores an operating system 116 for controlling the operation of the client computer 32. The memory 114 also includes a WWW browser 118, such as Netscape's NAVIGATOR® or Microsoft's INTERNET EXPLORER® browsers, for accessing the WWW. It will be appreciated that these components may be stored on a computer-readable medium and loaded into memory 114 of the client computer 32 using a drive mechanism associated with the computer-readable medium, such as a floppy drive (not shown), CD-ROM/DVD-ROM drive 120, or hard drive 123. A graphic image may also be stored on hard drive 123 for transmission to WWW server 34. An input/output interface 122 may also be provided for receiving input from a mouse, keyboard, or other input device. The memory 114, network interface unit 106, video display adapter 112, and input/output interface 122 are all connected to the central processing unit 110 via bus 124. Other peripherals may also be connected to the central processing unit 110 in a similar manner.

WWW browser 118 may utilize a JAVA virtual machine to execute JAVA "applets" as known to those skilled in the art. In particular, an image processing applet 128 may be utilized to crop or otherwise manipulate the graphic image provided by consumer 30 before transmission to the WWW server 34. An external viewer/proofing application 134, such as ACROBAT® from ADOBE CORPORATION, may also be used to proof the graphic image prior to transmission to WWW server 34. Operation of the image processing applet 128 is described in detail below with reference to FIG. 9C. A shipping applet 130 may also be utilized for communication with shipping company 52 to determine the status of a shipment of merchandise. Additionally, a shopping cart applet 132 may be utilized to allow the consumer to add merchandise to a "shopping cart" as they shop, and then to "check out" when their shopping is completed. Shipping and shopping cart applets are well known to those skilled in the art.

Figure 5:
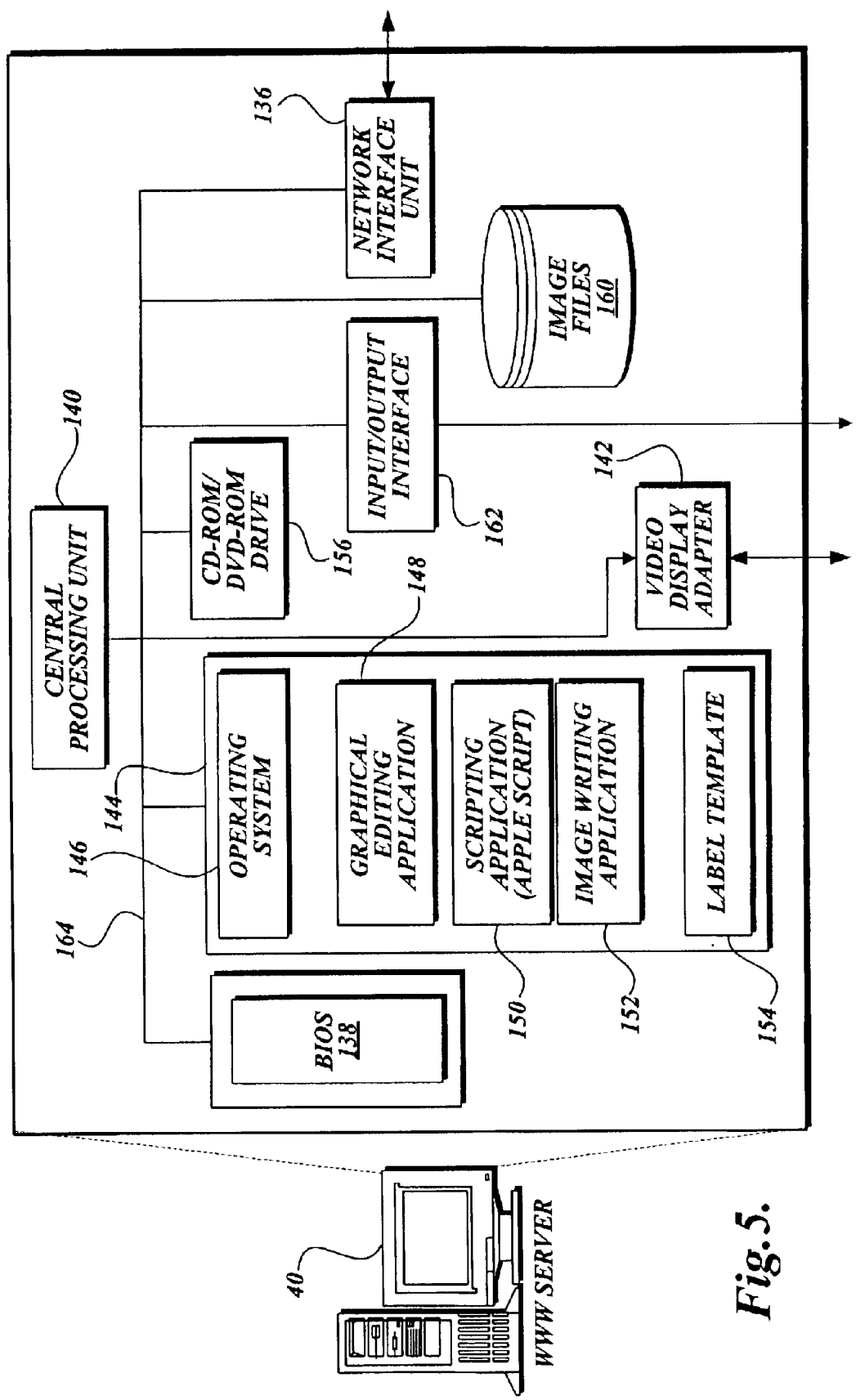
FIG. 5 is a block diagram depicting an illustrative architecture for an actual print server computer embodying aspects of the present invention.

FIG. 5 depicts several of the key components of the print server computer 40. Those of ordinary skill in the art will appreciate that the print server computer 40 includes many more components then those shown in FIG. 5. However, it is not necessary that all of these generally conventional components be shown in order to disclose an illustrative embodiment for practicing the present invention. As shown in FIG. 5, the print server computer 40 includes a network interface unit 136 for connecting to a LAN or WAN, or for connecting remotely to a LAN or WAN. Those of ordinary skill in the art will appreciate that the network interface unit 136 includes the necessary circuitry for such a connection, and is also constructed for use with the TCP/IP protocol, the particular network configuration of the LAN or WAN it is connecting to, and a particular type of coupling medium. The print server computer 40 may also be equipped with a network interface unit 136 capable of connecting to the Internet through a point to point protocol ("PPP") connection or a SLIP connection as known to those skilled in the art.

The print server computer 40 also includes a ROM BIOS 138, central processing unit 140, a video display adapter 142, and a memory 144. The memory 144 generally comprises a random access memory ("RAM"), a read-only memory ("ROM") and a permanent mass storage device, such as a disk drive (not shown). The memory 144 stores an operating system 146 for controlling the operation of the print server computer 40. The memory 144 also includes a scripting application program 150, such as APPLE-SCRIPT® from APPLE COMPUTER CORPORATION, for controlling the operation of a graphical editing application 148 and an image writing application 152. In an illustrative embodiment, the scripting application program 150 receives a graphic image and text information from WWW server 34 for inclusion on a bottle label. Scripting application program 150 then launches the graphical editing application 148 with the label template 154. The graphic image and text information are loaded into the label template 154 by graphical editing application 148. The label template 154 contains information indicating how the graphic image and text information should be placed to create a bottle label. Once this information has been loaded into the label template 154, scripting application 150 instructs the graphical editing application 148 to print the label on laser printer 46. Moreover, the scripting application 150 instructs the image writing application 152 to write the completed label into the image files database 160 for later use by WWW server 34. Once this process has been completed, the scripting application 150 waits for the next graphic image to be transmitted by WWW server 34. Other methods for printing labels will be apparent to those skilled in the art.

It will be appreciated that the operating system 146, graphical editing application 148, scripting application 150, image writing application 152, and label template 154 may be stored on a computer-readable medium and loaded into memory 144 of the print server computer 40 using a drive mechanism associated with the computer-readable medium, such as a floppy drive (not shown), CD-ROM/DVD-ROM drive 156, or hard drive (not shown). An input/output interface 162 may also be provided for receiving input from a mouse, keyboard, or other input device. The memory 144, network interface unit 136, video display adapter 142, and input/output interface 162 are all connected to the central processing unit 140 via bus 164. Other peripherals may also be connected to the central processing unit 140 in a similar manner.

Figure 6:
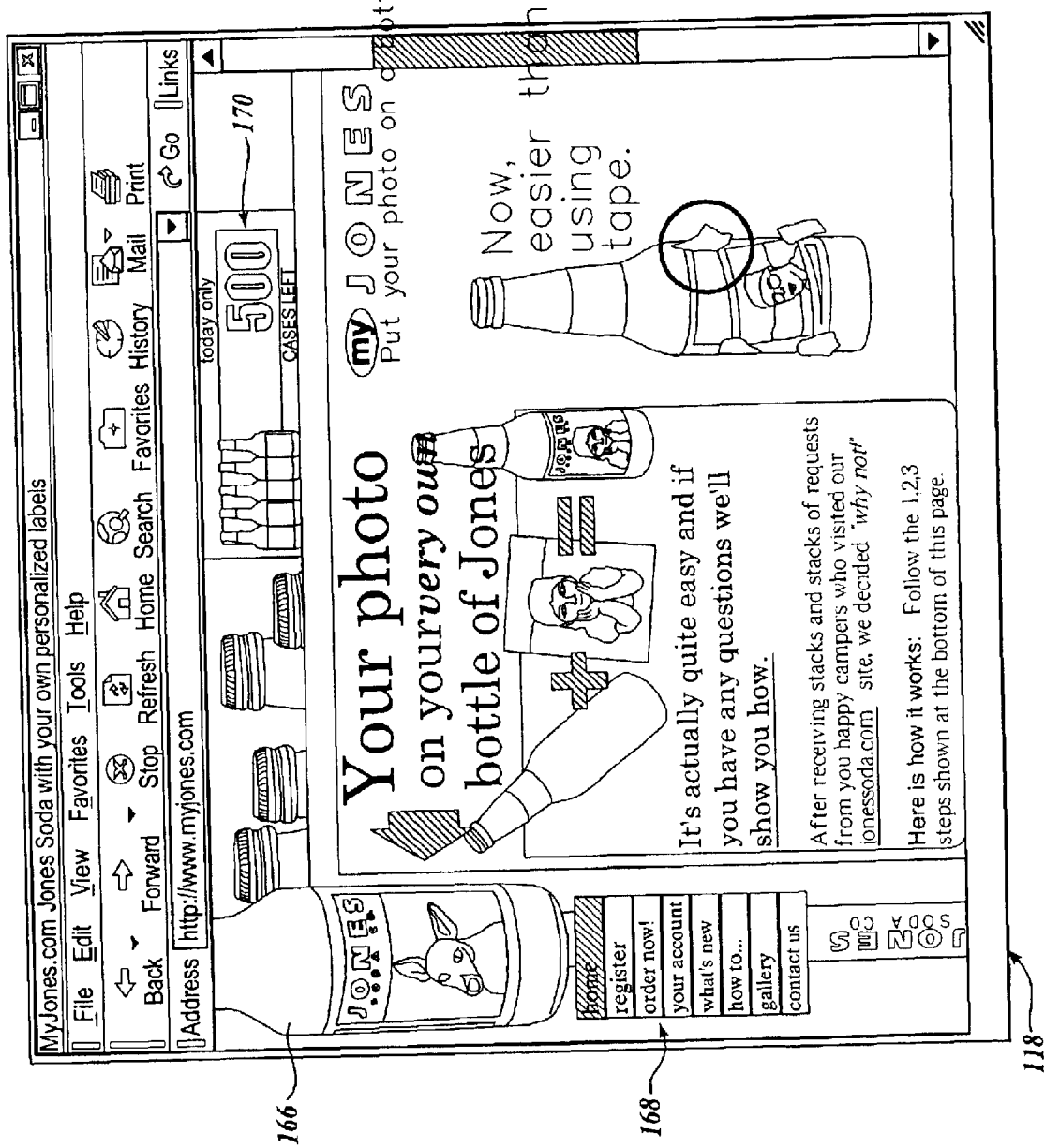
FIG. 6 is a window produced by a WWW browser installed on a client computer browsing a WWW site embodying aspects of the present invention.

FIGS. 6–11B show screen shots describing the operation of an actual WWW site embodying aspects of the present invention. The screen shots in FIGS. 6–11B are generated by a WWW browser 118 executing on a client computer 32 that is utilized to interact with a WWW site for creating and ordering customized branded merchandise provided by WWW server 34. Referring now to FIG. 6, aspects of the WWW site will be described. WWW browser 118 may be utilized to connect with a WWW site 166 located at the MYJONES.COM URL. Once the WWW browser 118 has connected to the WWW site 166, a menu 168 is displayed. The menu 168 may include menu items for registering as a new user of the WWW site 166, ordering customized branded merchandise, reviewing account status, displaying new information at the WWW site 166, and reviewing a gallery of graphic images submitted by other users of the WWW site 166. Other menu items may be displayed that are apparent to those skilled in the art. Additionally, an indicator 170 may be displayed for indicating the quantity of a particular merchandise item that is available. In an embodiment of the present invention, the indicator 170 describes the remaining quantity of a merchandise item for a particular day. For instance, the indicator 170 may show the number of cases of soda out of 500 total that are available for purchase on a particular day.

Figure 7A:
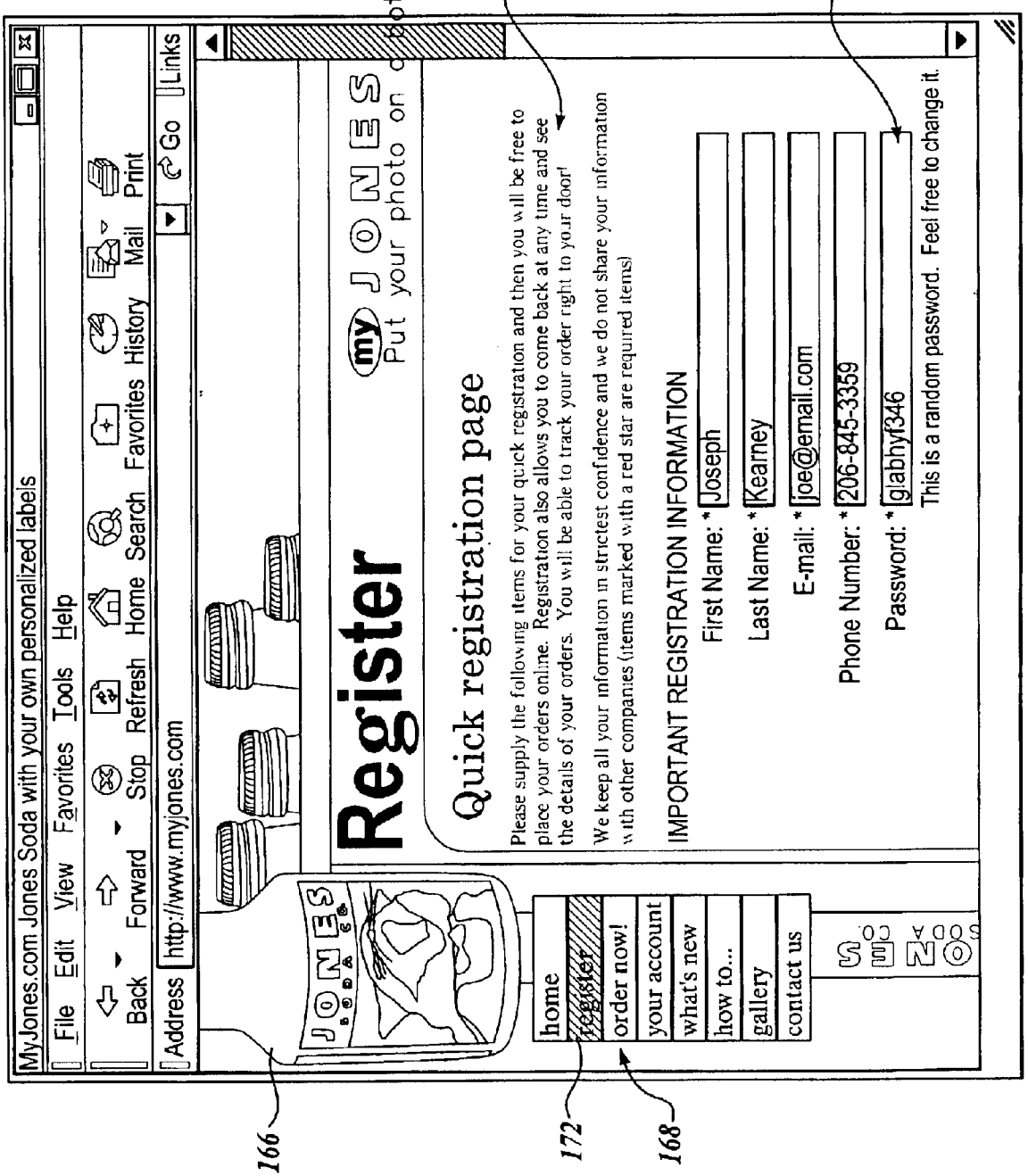
FIGS. 7A and 7B illustrate windows produced by a WWW browser installed on a client computer browsing a WWW site embodying aspects of the present invention.
Figure 7B:
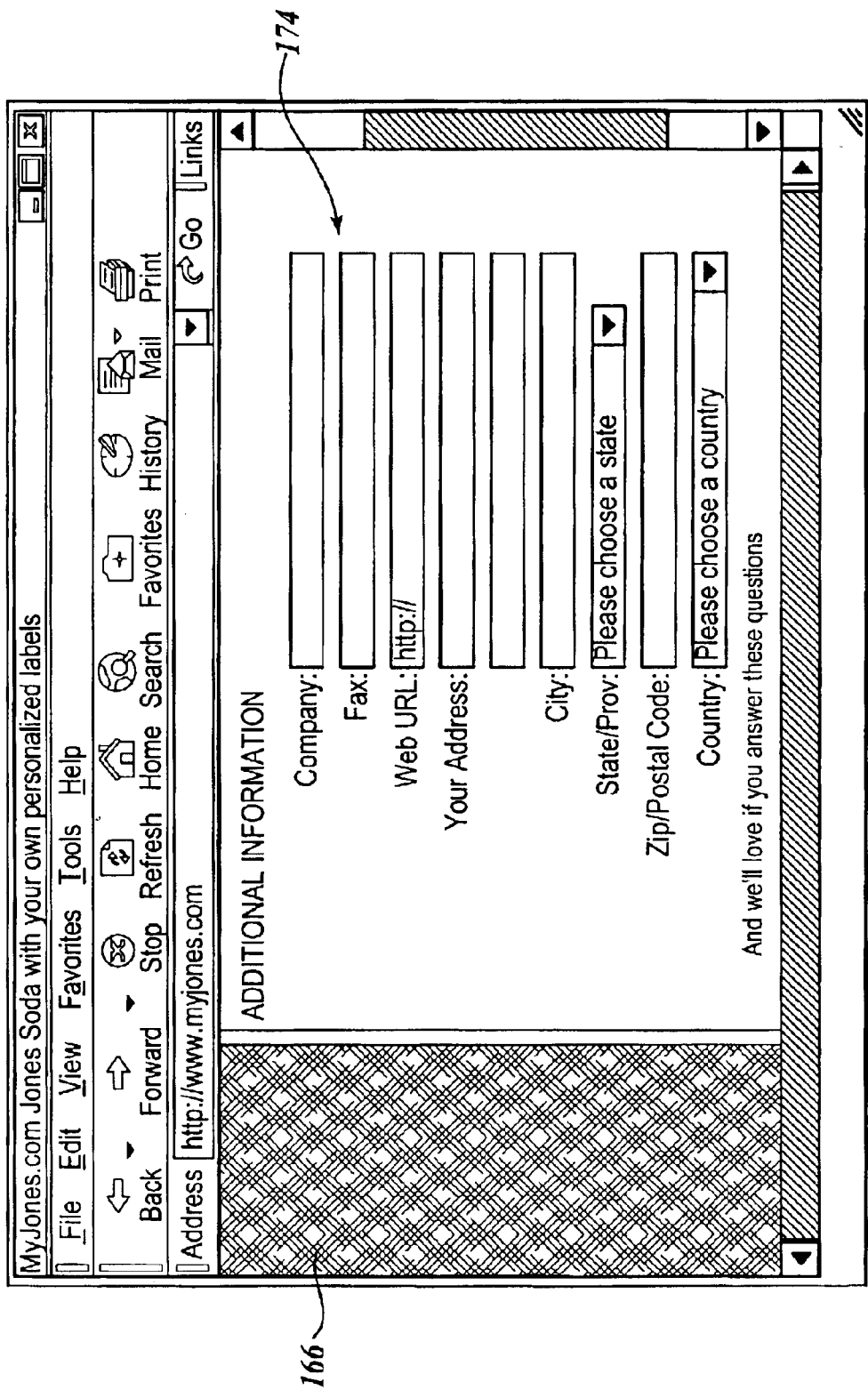

If the consumer selects the register menu item 172 from the menu 168, a register WWW page 174 will be displayed on WWW browser 118 as shown in FIGS. 7A and 7B. The register WWW page 174 includes a WWW form for obtaining registration information from the consumer. In particular, the form requests that the consumer provide their first and last names, e-mail address, and phone number. The WWW form may also ask for additional information, such as the consumer's company name, fax number, WWW URL, address, city, state/province, zip/postal code, and country. Additionally, a random password 176 may be assigned to the consumer. The consumer may utilize the random password 176 or select a password of their own choosing. Once the consumer has filled out the form, the consumer may select a "submit" button on WWW browser 118 to transmit the information to WWW server 34. The WWW server 34 then creates a new entry in the customer database 96 with the provided information.

Figure 8A:
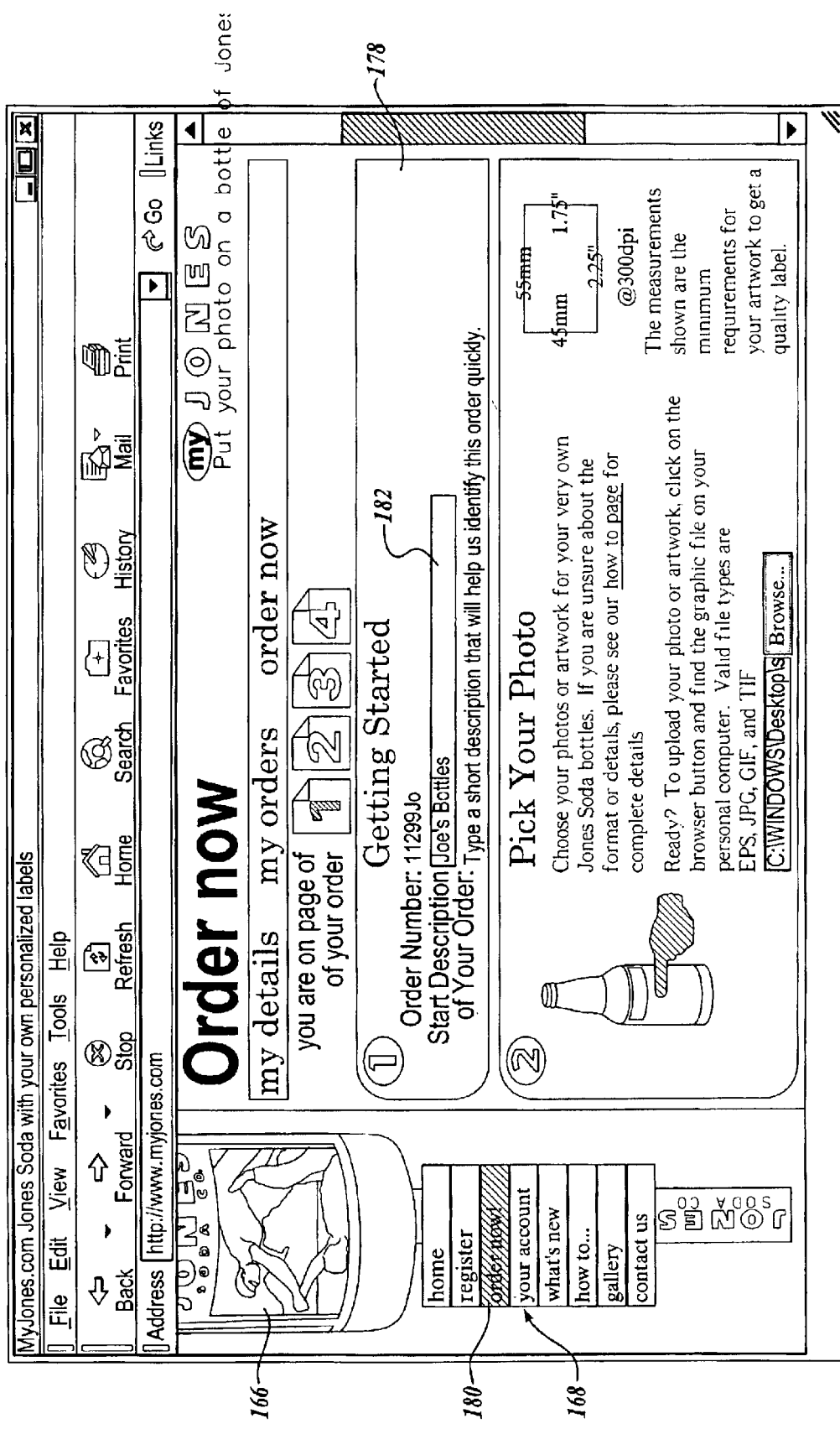
FIGS. 8A and 8B illustrate windows produced by a WWW browser installed on a client computer browsing a WWW site embodying aspects of the present invention.
Figure 8B:
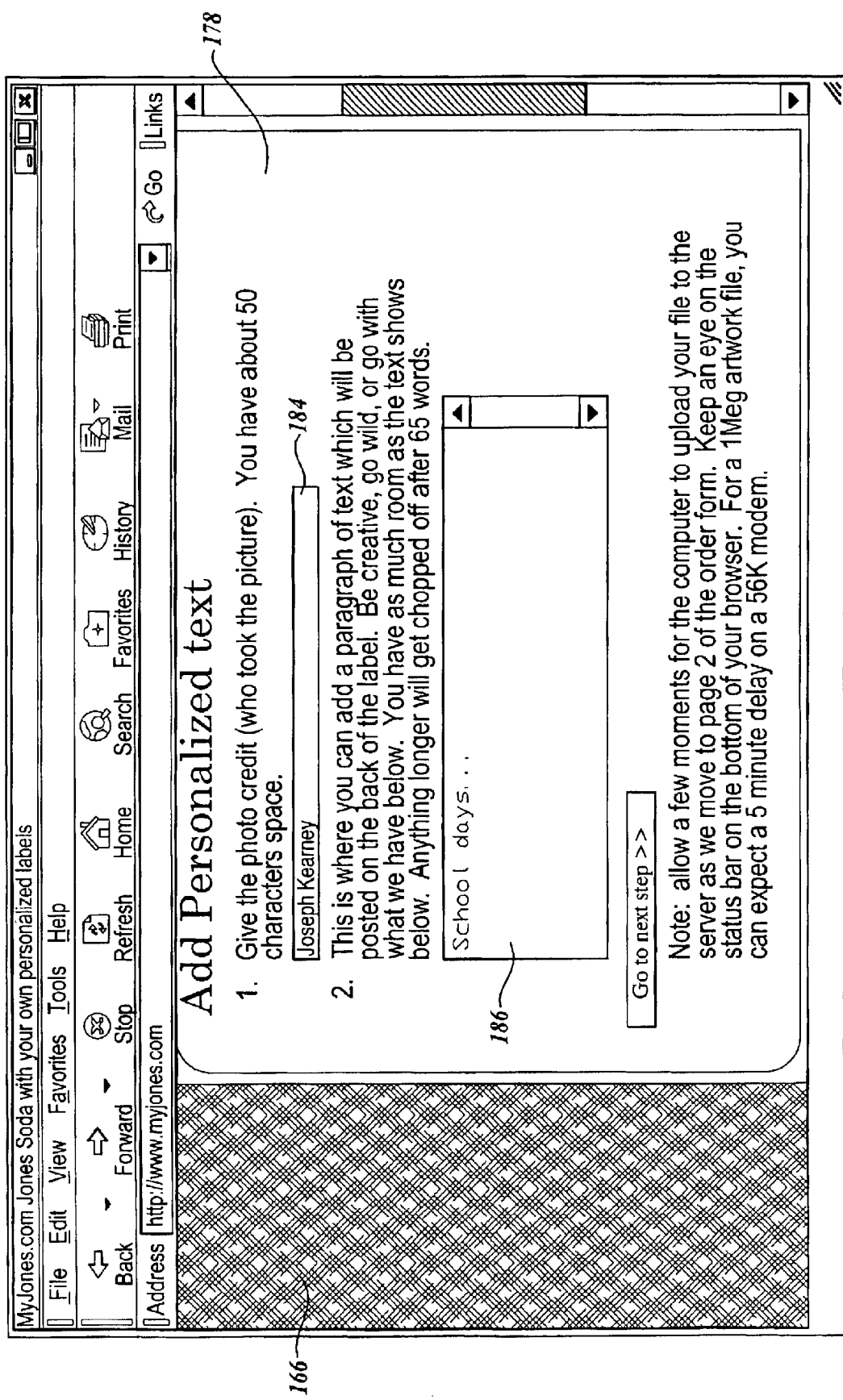

If the consumer selects the order menu item 180 from the menu 168, an order WWW page 178 will be displayed on WWW browser 118 as shown in FIGS. 8A and 8B. The order WWW page 178 includes a WWW form for obtaining order information from the consumer. In particular, the form requests that the consumer provide a short description of the order 182. For instance, the text "Joe's Bottles" could be provided to describe the order. The WWW form may also ask the consumer to provide the location of a graphic image. The graphic image may be located on client computer 32, or may be located elsewhere on the Internet. A "browse" button may be provided to assist the consumer in located the desired graphic image. In an embodiment of the present invention, the consumer may be required to provide a graphic image not exceeding a predetermined size. According to another embodiment of the present invention, an applet may be provided that allows the consumer to crop or otherwise manipulate the graphic image. This is described in more detail below with reference to FIG. 9C.

The form provided at the order WWW page 178 may also prompt the consumer to provide a photo credit 184 for the identified graphic image. Additionally, the consumer may also be prompted to provide a text message 186 for inclusion on the customized merchandise. When the consumer has provided this information, the user may select a "submit" button to transmit the short description of the order 182, the graphic image, the photo credit 184, and the text message 186 to the WWW server 34.

Figure 9A:
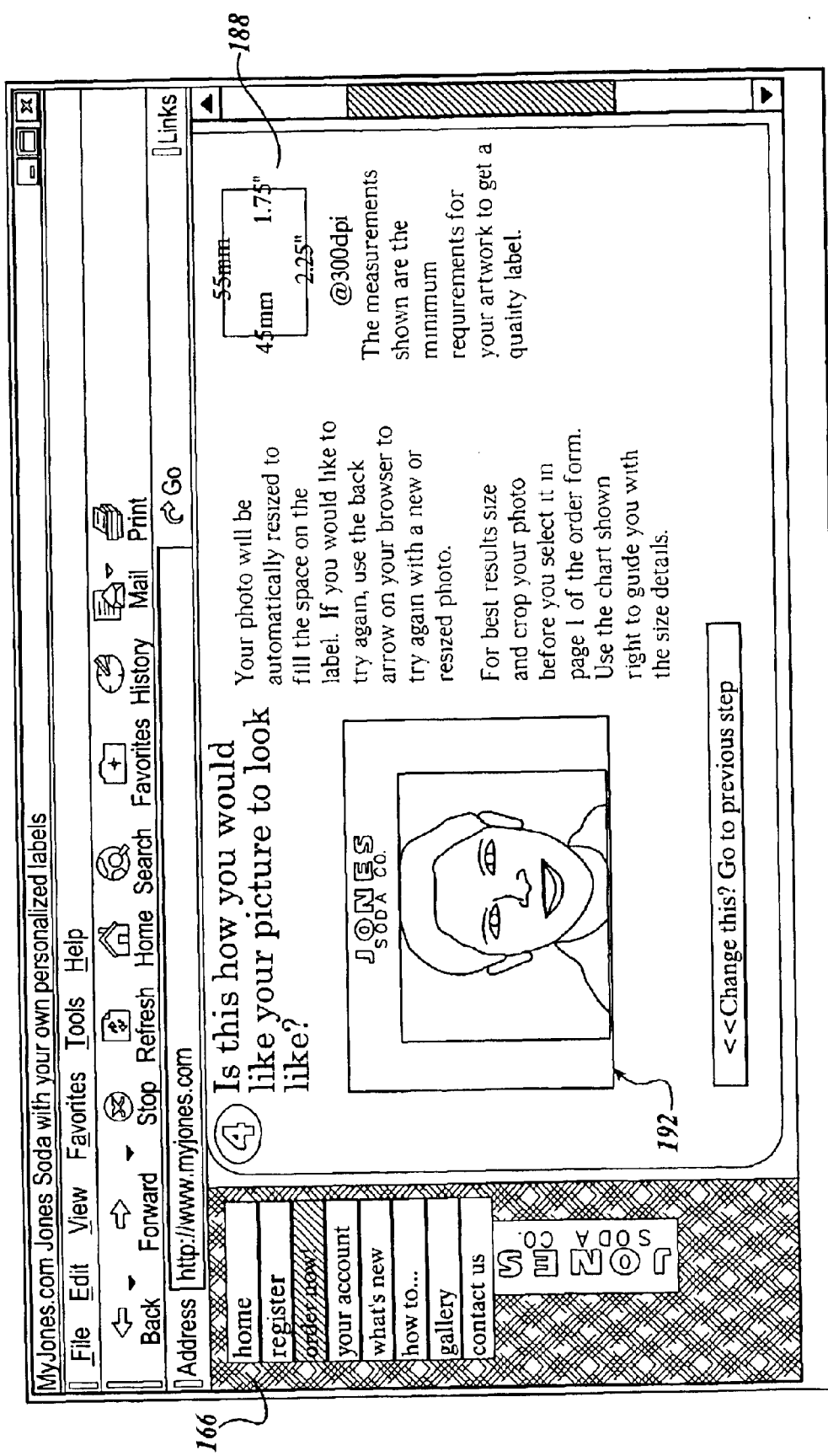
FIGS. 9A, 9B, and 9C illustrate windows produced by a WWW browser installed on a client computer browsing a WWW site embodying aspects of the present invention.
Figure 9B:
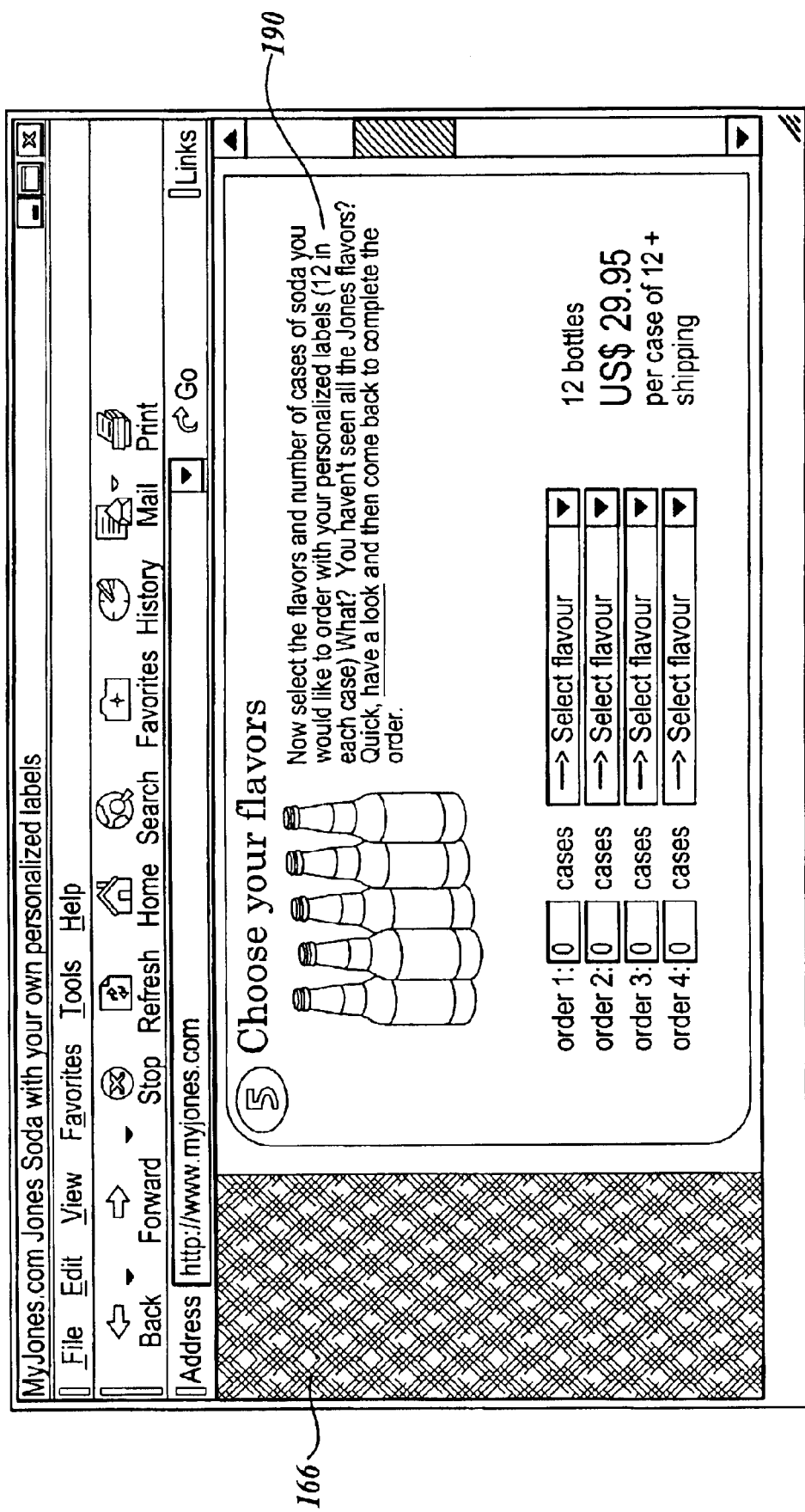

In response to receiving this information at the WWW server 34, a preview WWW page 188 is generated by the WWW server 34 and transmitted to the WWW browser 118, as shown in FIG. 9A. The preview WWW page 188 includes a preview 192 of the merchandise item customized with the graphic image provided by the consumer. In an illustrative embodiment of the present invention, a bottle label is displayed that includes the graphic image provided by the consumer and a trademark, such as "JONES SODA CO." The consumer may then choose to return to the previous page and change the graphic image, or to continue to the order specification WWW page 190, as shown in FIG. 9B.

The order specification WWW page 190 includes a WWW form for selecting the quantity and type of customized branded merchandise to be ordered by the consumer. According to an actual embodiment of the present invention, the consumer may select the type (e.g. orange, strawberry, etc.) and the number of cases of customized soda bottles to be ordered. Once the consumer has provided this information, they may continue to the checkout WWW page, shown in FIGS. 10A–10B.

Figure 9C:
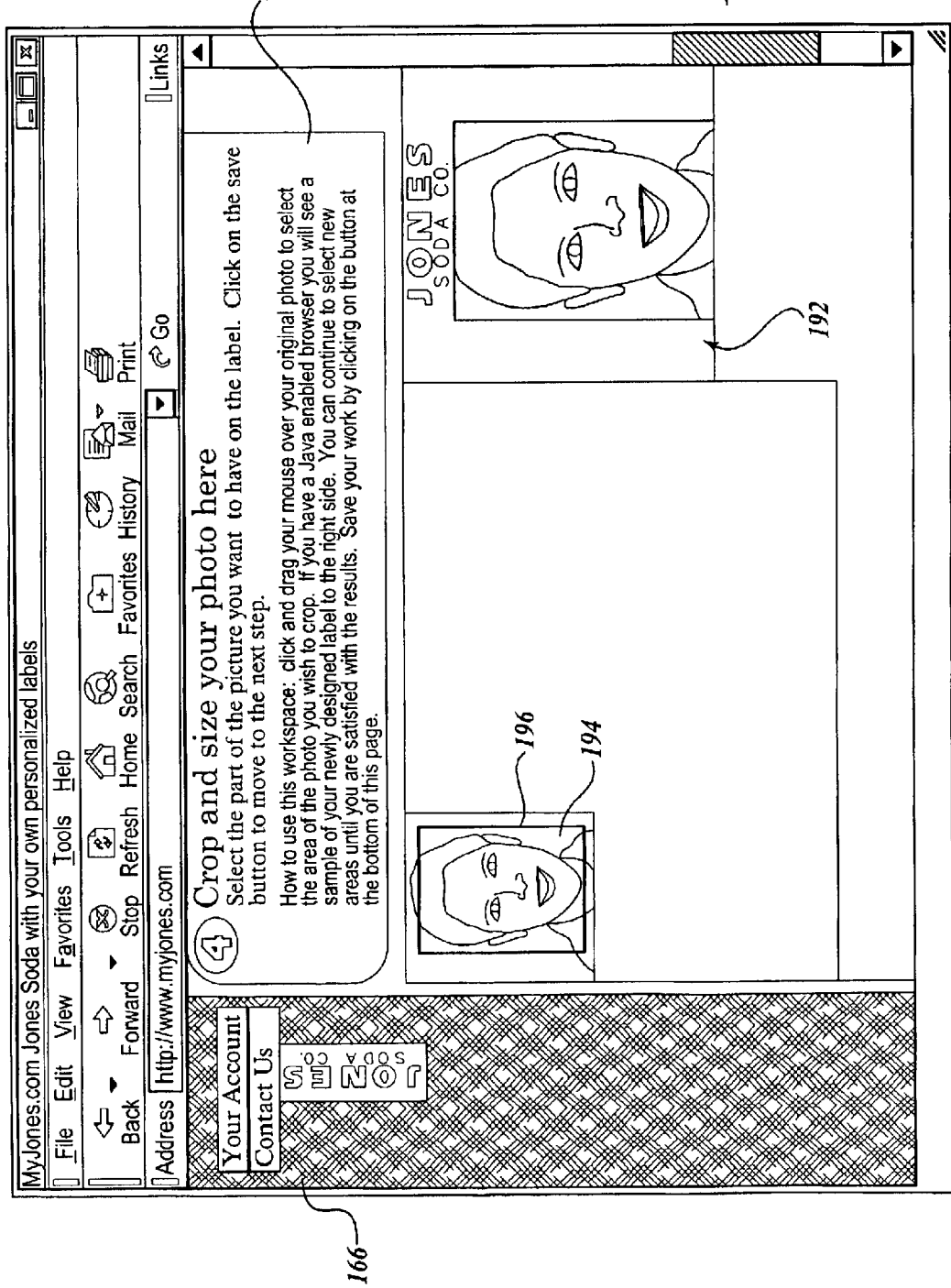

Referring now to FIG. 9C, an image manipulation WWW page 198 will be described. As mentioned above, a JAVA applet for image manipulation may be transmitted from WWW server 34 to client computer 32 for execution within WWW browser 118. According to an embodiment of the present invention, an applet for "cropping" the graphic image 194 is provided. This allows the consumer to take a graphic image that may be too large to fit on a bottle label to crop the image to a suitable size. To accomplish this, an image manipulation WWW page 198 is provided after the consumer has identified the graphic image 194. A selection tool 196 is also provided to allow the consumer to select a portion of the graphic image 194 using a mouse or other selection device. A preview window 192 is also displayed in WWW browser 118 that provides a preview of what the label will look like after the selected area of the graphic image has been cropped. In this manner, the consumer can ensure that the label will meet their exact specifications. Once the consumer has finished, they may submit the cropped graphic image to the WWW server 34. Those skilled in the art should appreciate that the image manipulation applet could provide a wide variety of manipulation features, such as image rotation, skewing, coloring, distorting, and other effects known to those skilled in the art.

Figure 10A:
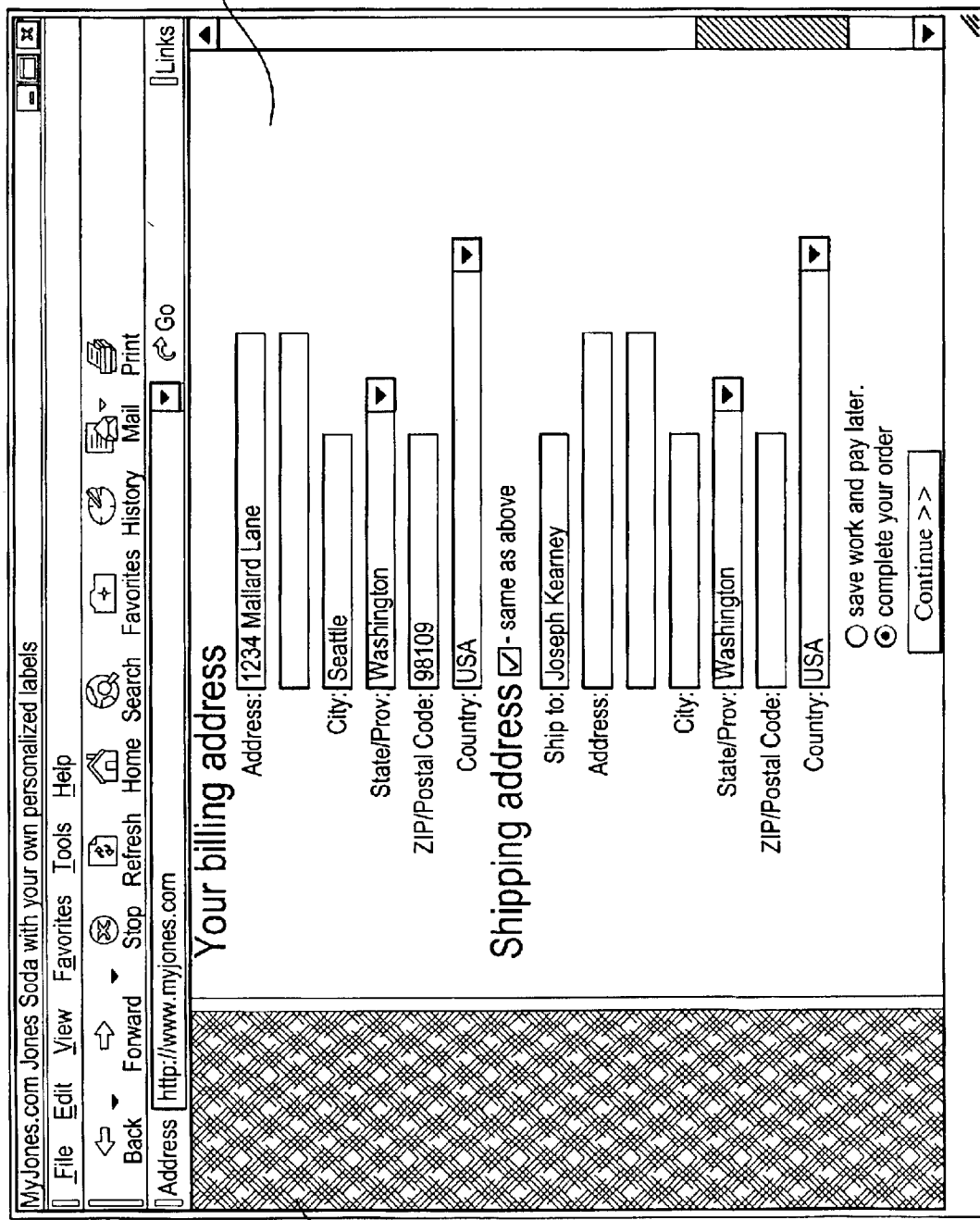
FIGS. 10A and 10B illustrate windows produced by a WWW browser installed on a client computer browsing a WWW site embodying aspects of the present invention.
Figure 10B:
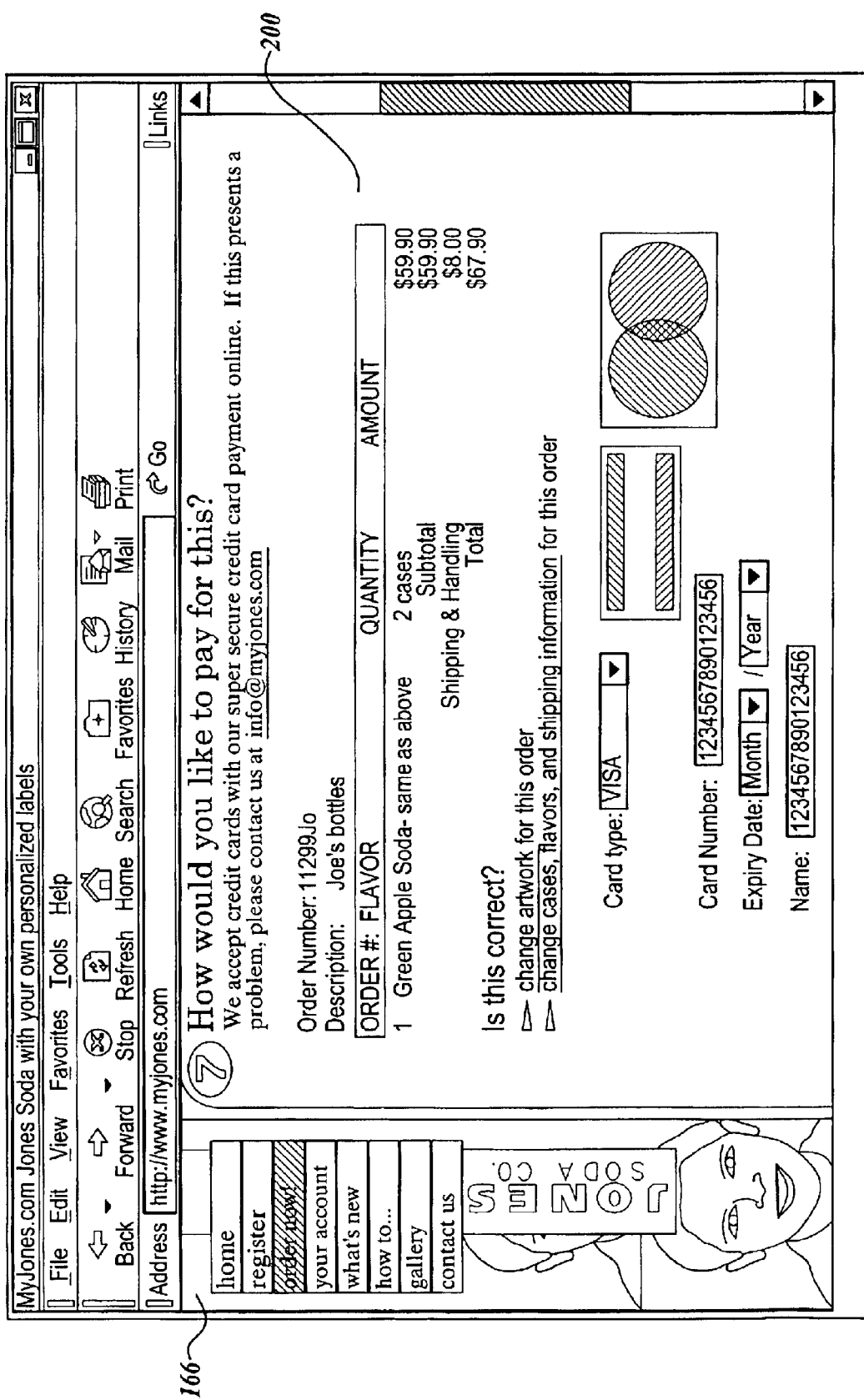
Figure 11A:
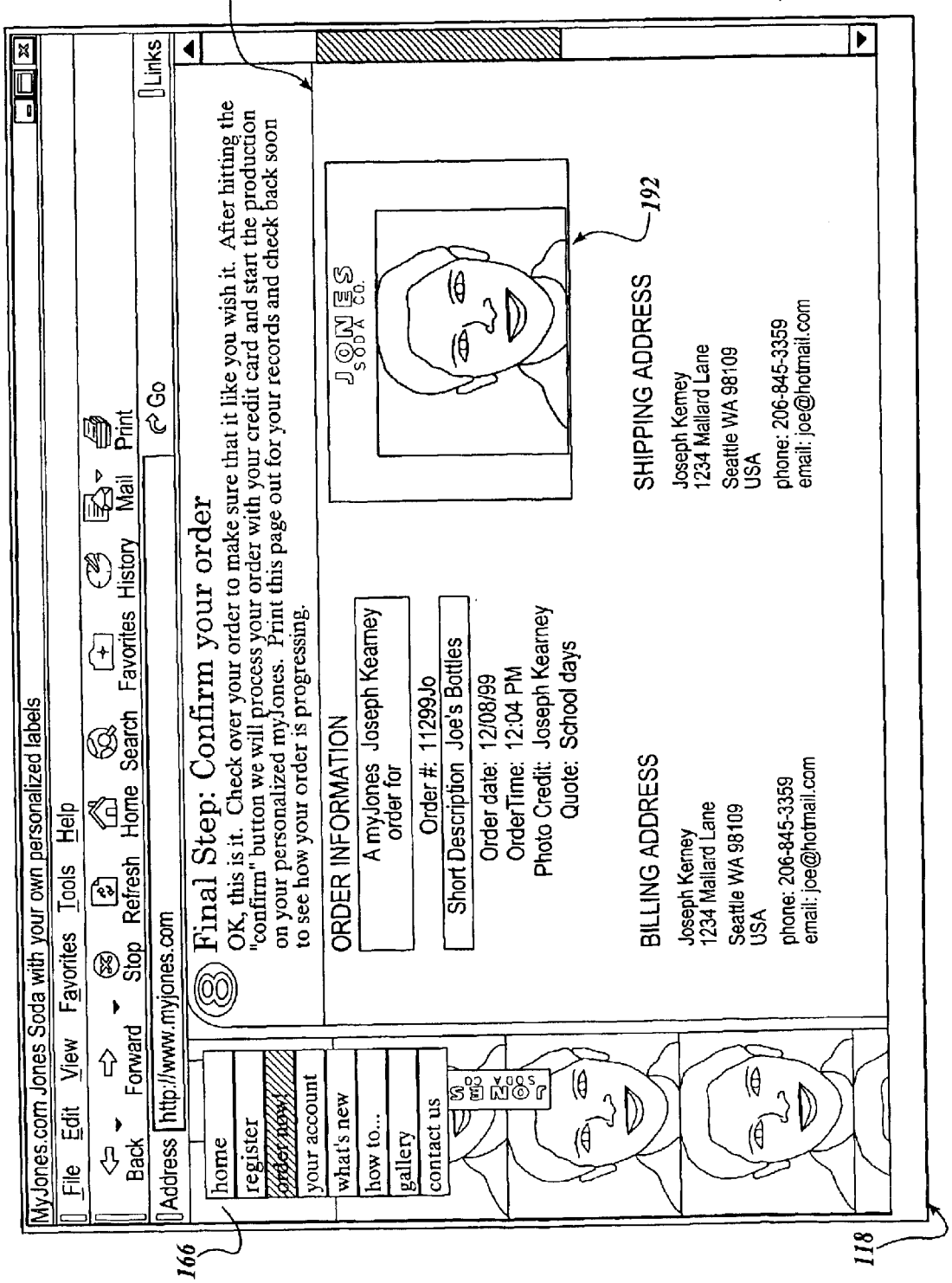
FIGS. 11A and 11B illustrate windows produced by a WWW browser installed on a client computer browsing a WWW site embodying aspects of the present invention.
Figure 11B:
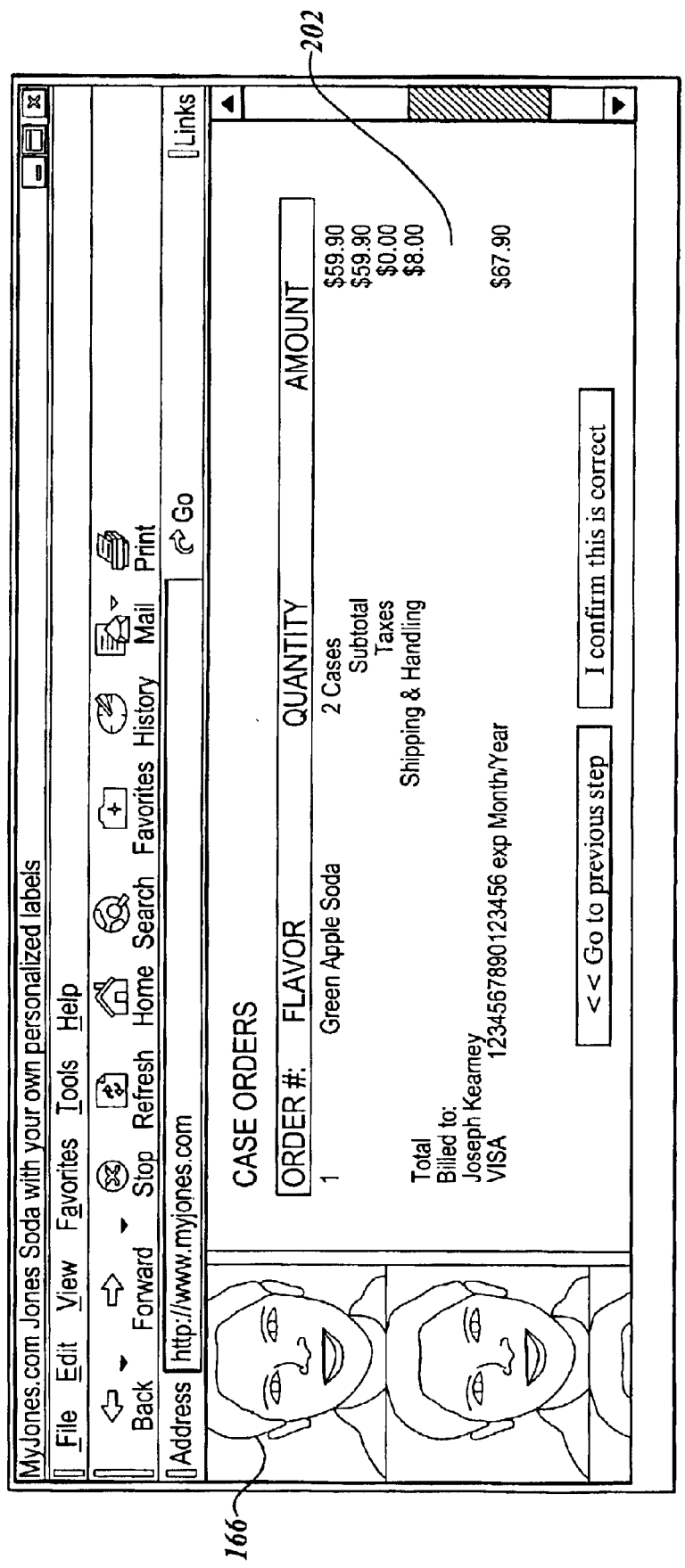

Once the consumer has completed the manipulation of the graphic image, and has selected the quantity and type of customized branded merchandise to be ordered, the WWW server 34 may provide a checkout WWW page 200, as shown in FIGS. 11A–10B. The checkout WWW page 200 may include a WWW form for receiving the consumer's billing address and shipping address. Moreover, the checkout WWW page 200 may also provide a user interface button allowing the consumer to save their order for later completion. As shown in FIG. 10B, the checkout WWW page 200 may also include a WWW form for receiving payment information from the consumer. In particular, the consumer may specify a credit card type, number, expiration date, and authorized name. Once the consumer has provided this information, a confirmation WWW page 202 may be displayed, as shown in FIGS. 11A–11B.

The confirmation WWW page 202 may display a summary of the consumer's order, including the short description of the order 182, order date, order time, photo credit 184, text message 186, billing address, shipping address, order quantity and type, and credit card information. Additionally, the preview 192 of the label may also be displayed. The consumer may then be permitted to return to any previous page to correct any incorrect items, or to confirm the order for processing. If the consumer confirms the order, the labels are printed, the bottles labeled, and the order is sent to the customer as described above. The consumer may then return to the main WWW page to select any of the items from menu 168 again.

Figure 12:
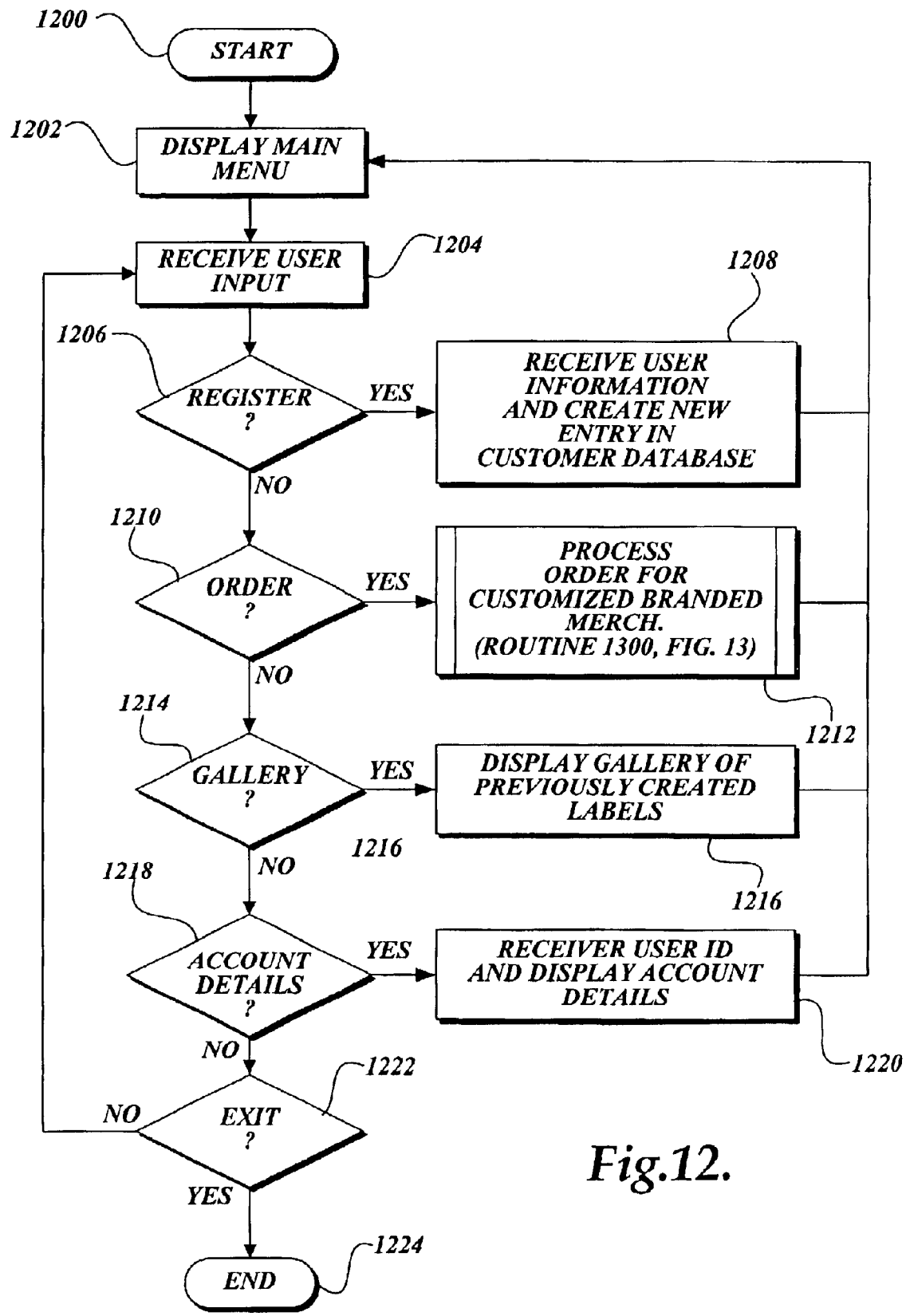
FIG. 12 is a flow chart showing an illustrative routine for creating and ordering a customized branded merchandise item in accordance with the present invention.

Referring now to FIG. 12, an illustrative routine 1200 for creating and ordering customized branded merchandise will be described. Routine 1200 begins at step 1202, where a main menu is displayed, such as menu 168, described above. The main menu may contain menu items for registering as a new user, ordering merchandise, viewing a gallery of images supplied by other users, and viewing account details. Other menu items may also be provided.

Routine 1200 continues from step 1202 to step 1204, where user input is received. User input may comprise a selection of a menu item using a mouse, keyboard, or other input device. At step 1206, a determination is made as to whether user input was received selecting the menu item for registering. If such user input was received, routine 1200 branches to step 1208, where user information is received and a new entry is created in the customer database. User information may be received in the manner described above with respect to FIGS. 7A–7B.

If, at step 1206, it is determined that user input was not received selecting the register menu item, routine 1200 continues to step 1210. At step 1210, a determination is made as to whether user input was received selecting a menu item for ordering merchandise. If such user input was received, routine 1200 branches to step 1212, where the order is processed. An illustrative routine 1300 for processing an order is described below with reference to FIGS. 13A–13B. If it is determined at step 1210 that user input was not received selecting an order menu item, routine 1200 continues to step 1214.

At step 1214, a determination is made as to whether user input was received selecting a menu item for displaying a gallery of previously submitted images. If such user input was received, routine 1200 branches to step 1216, where a gallery of previously submitted graphic images may be displayed. Alternatively, a gallery of previously created labels may be displayed. If, at step 1214, it is determined that user input was not received selecting a menu item for viewing a gallery, routine 1200 continues to step 1218. At At step 1218, a determination is made as to whether user input was received selecting a menu item for displaying account details. If such user input was received, routine 1200 branches to step 1220 where a user identification number is received and account details corresponding to the user identification number are displayed. Account details may include information regarding pending orders, previous orders, and the like. Additionally, the user may be permitted to modify account information, such as billing or shipping addresses and payment information.

If, at step 1218, it is determined that user input was not received selecting a menu item for providing account details, routine 1200 continues to step 1222. At step 1222, a determination is made as to whether user input was received selecting an "exit" menu item. If such user input was not received, routine 1200 branches to step 1204, where additional user input is received. If such user input was received, routine 1200 continues to step 1224, where it ends.

Figure 13A:
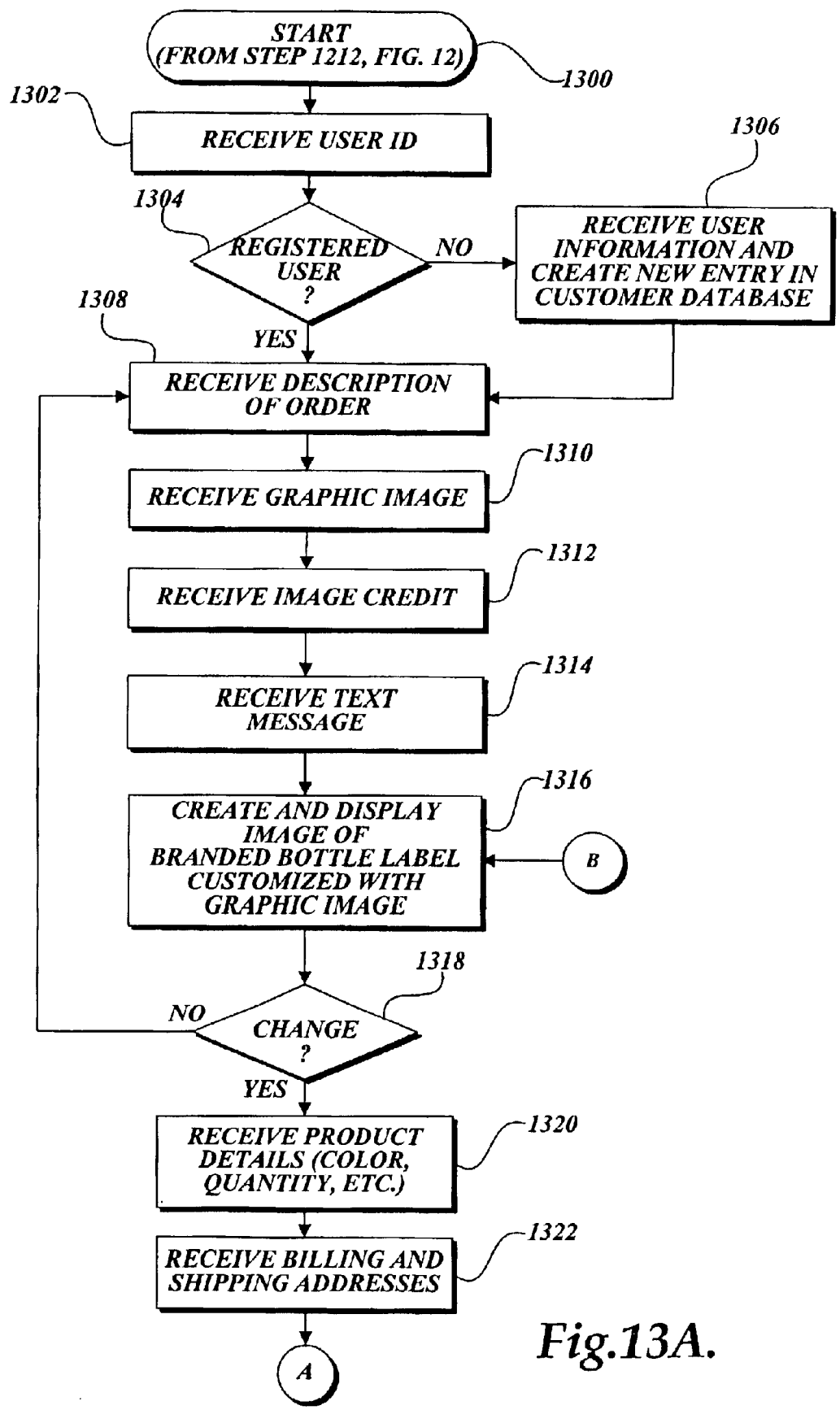
FIGS. 13A and 13B contain a flow chart showing an illustrative routine for processing an order for a branded merchandise item customized with a user provided image in accordance with the present invention.
Figure 13B:
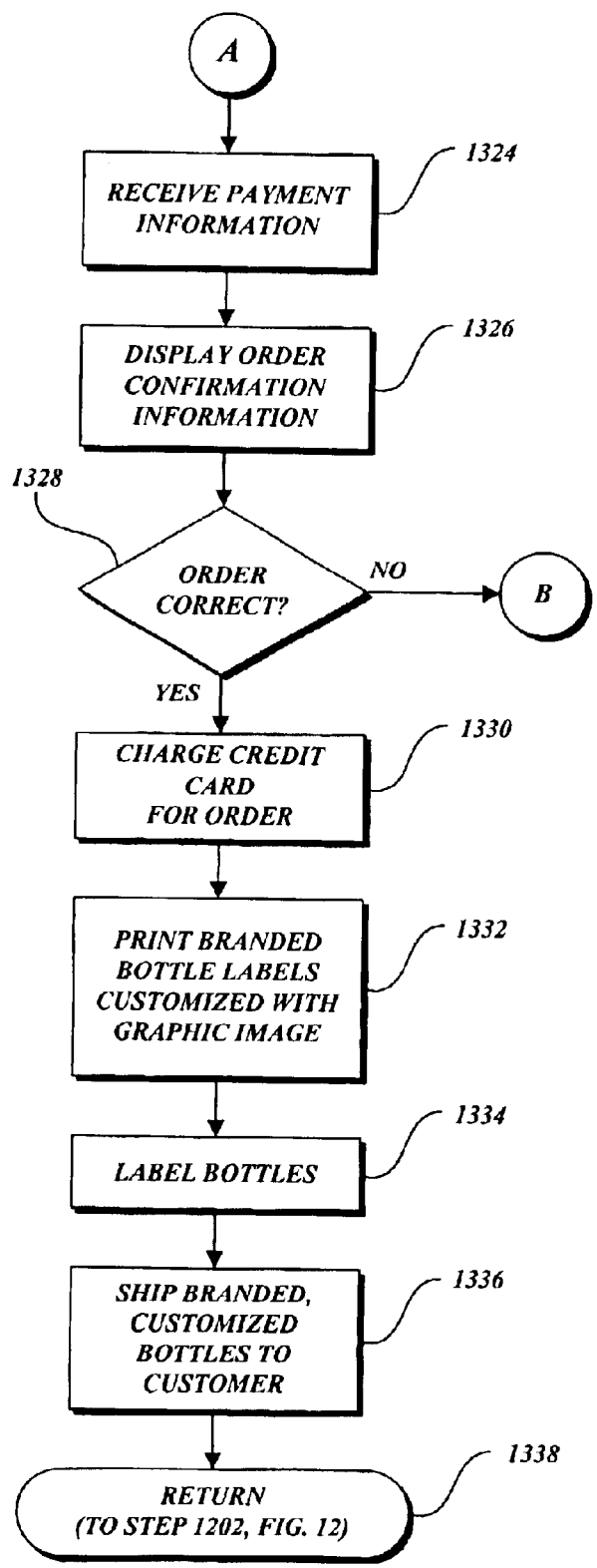

Referring now to FIGS. 13A and 13B, an illustrative routine 1300 for processing an order for customized branded merchandise will be described. Routine 1300 begins at step 1302, where a user identification number is received. At step 1304, a determination is made as to whether the received user identification number corresponds to a registered user. If the user identification number does not correspond to a registered user, routine 1300 branches to step 1306, where user information is received and a new entry is created in a customer database.

If, at step 1304, it is determined that the received user identification number corresponds to a registered user, routine 1300 continues to step 1308. At step 1308 a short text description of the order is received. At step 1310 a graphic image is received. As described above, the graphic image may have been cropped by the consumer using an image manipulation applet prior to transmission. At step 1312, an image credit is received. At step 1314, a text message is received.

At step 1316 a preview is generated and displayed. The preview may include a preview of how the merchandise item will appear once it has been customized with the graphic image and text message provided by the consumer. In an embodiment of the present invention, a bottle label is displayed that is branded with a trademark, such as "JONES SODA CO.", and that has been customized with the graphic image and text message provided by the consumer. The user may then be prompted for input indicating whether or not the preview appears acceptable.

If, at step 1318, user input is received indicating that the user desires to change the preview, routine 1300 branches to step 1308. If the user is satisfied with the preview, routine 1300 continues to step 1320, where product details are received. Product details may include the color, type, quantity, etc. of the merchandise being order. In an illustrative embodiment of the present invention, the product details include the type of soda and the number of cases requested by the consumer.

At step 1322, a billing and a shipping address are received. At step 1324, payment information is received, such as a credit card number and expiration date. At step 1326, an order confirmation screen is displayed containing a summary of the order and asking the user to indicate whether the order is correct. At step 1328, a determination is made as to whether user input was received indicating that the order was correct. If such user input was not received, routine 1300 branches to step 1316.

If it is determined at step 1328 that user input was received indicating that the order is correct, routine 1300 continues to step 1330, where the provided credit card number is charged. From step 1330, the routine continues to step 1332 where the customized merchandise is created. In an embodiment of the invention, labels are printed having a trademark, the graphic image provided by the user, the text message, and the photo credit. At step 1334, the bottles are labeled, and at step 1336; the customized branded bottles are shipped to the purchaser. At step 1338, the routine 1300 returns to step 1202, FIG. 12.

In light of the above, it should be appreciated that the present invention provides a method and system for creating and ordering customized branded merchandise. According to an embodiment of the invention, a consumer may provide a graphic image and a text message at an Internet WWW site. A bottle label is then prepared and printed having a trademark and the graphic image and text message provided by the consumer. The label is then used to label a quantity of bottles ordered by the consumer, and the bottles are shipped to the consumer. While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computer system having a graphical user interface including a display and a user interface selection device, a method for creating and providing customized branded merchandise over a communication network, the method comprising:

obtaining a request for a merchandise item from a requester wherein the merchandise item is associated with a manufacturer provided brand;

generating a set of display items, the set of display items operable to be generated on the computer system display and operable to obtain a customization of an appearance of the merchandise item;

obtaining a requester manipulation of the set of display items from the user interface selection device corresponding to a customization of the merchandise item;

customizing an appearance of the merchandise item in accordance with the requester manipulation to create a customized merchandise item;

branding the customized merchandise item to create a branded customized merchandise item, wherein the manufacturer provide brand is part of the customized appearance; and providing the branded customized merchandise item to the requester of the merchandise item.

2. The method as recited in claim 1, wherein the set of display items includes one or more display items for obtaining a user registration corresponding to the customization of the merchandise item.

3. The method as recited in claim 1, wherein the set of display items includes at least one display item operable to obtain an order identifier corresponding to the customization of the merchandise item.

4. The method as recited in claim 1, wherein the set of display items includes at least one display item operable to obtain a digital image, wherein customizing the appearance includes appending at least a portion of the digital image to the merchandise item.

5. The method as recited in claim 1, wherein the set of display items includes at least one item operable to obtain a textual message corresponding to the customization of the merchandise item, and wherein customizing the appearance includes appending at least a portion of the textual message to the merchandise item.

6. The method as recited in claim 1 further comprising displaying on the computer system display a result of the customization prior to customizing the merchandise item.

7. The method as recited in claim 6 further comprising obtaining a requester manipulation of the customization prior to customizing the merchandise item.

8. The method as recited in claim 7, wherein the requester manipulation includes cropping of an image with the user interface selection device.

9. The method as recited in claim 1, wherein the set of display items includes at least one display item for obtaining a quantity of merchandise items corresponding to the customization of the merchandise item.

10. The method as recited in claim 1, wherein the merchandise item is a bottle.

11. The method as recited in claim 10, wherein the set of display items includes at least one display item operable to obtain a specification of a flavor of beverage corresponding to the customization of the merchandise item.

12. The method as recited in claim 1, wherein the communication network is the Internet and wherein the graphical user interface is a World Wide Web Website.

* * * * *

UNITED STATES PATENT AND TRADEMARK OFFICE
CERTIFICATE OF CORRECTION

PATENT NO. : 6,845,365 B2
DATED : January 18, 2005
INVENTOR(S) : E.J.A. von Rosen et al.

It is certified that error appears in the above-identified patent and that said Letters Patent is hereby corrected as shown below:

Title page,
Item [*] Notice, insert in appropriate order:
-- This patent is subject to a terminal disclosure. --
Item [56], References Cited, FOREIGN PATENT DOCUMENTS, delete as duplicative "KR   2001104504 A 11/2001"
Item [57], ABSTRACT,
Line 3, "A Internet" should read -- An Internet --
Line 28, "at address" should read -- at an address --

Column 13,
Line 26, "manufacturer provide" should read -- manufacturer provided --

Signed and Sealed this

Seventh Day of June, 2005

JON W. DUDAS
*Director of the United States Patent and Trademark Office*